United States Patent
Schunk

(10) Patent No.: US 9,103,999 B2
(45) Date of Patent: Aug. 11, 2015

(54) OPTICAL DATA COMMUNICATION MODULE HAVING EMI CAGE

(71) Applicant: Avago Technologies General IP (Singapore) Pte. Ltd., Singapore (SG)

(72) Inventor: Nikolaus W. Schunk, Maxhuette-Haidhof (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 329 days.

(21) Appl. No.: 13/802,273

(22) Filed: Mar. 13, 2013

(65) Prior Publication Data

US 2014/0270659 A1  Sep. 18, 2014

(51) Int. Cl.
*G02B 6/42* (2006.01)

(52) U.S. Cl.
CPC ............ *G02B 6/4277* (2013.01); *G02B 6/4263* (2013.01); *G02B 6/4204* (2013.01); *G02B 6/4284* (2013.01)

(58) Field of Classification Search
CPC .. G02B 6/4277; G02B 6/4204; G02B 6/4263; G02B 2207/121
USPC .......................................................... 385/88–94
See application file for complete search history.

(56) References Cited

U.S. PATENT DOCUMENTS

| | | | |
|---|---|---|---|
| 5,434,939 A * | 7/1995 | Matsuda | 385/88 |
| 5,586,011 A * | 12/1996 | Alexander | 361/818 |
| 6,477,286 B1 * | 11/2002 | Ouchi | 385/14 |
| 6,527,458 B2 | 3/2003 | Kim | |
| 6,595,700 B2 * | 7/2003 | Steinberg et al. | 385/92 |
| 6,811,413 B2 | 11/2004 | Keeble et al. | |
| 6,915,049 B2 * | 7/2005 | Murata | 385/52 |
| 6,972,968 B2 | 12/2005 | Hwang | |
| 7,153,043 B1 | 12/2006 | Zhang et al. | |
| 7,253,388 B2 * | 8/2007 | Kuhmann et al. | 250/208.1 |
| 7,939,792 B2 | 5/2011 | Nyffenegger et al. | |
| 8,265,432 B2 * | 9/2012 | Doany et al. | 385/14 |
| 2003/0201462 A1 * | 10/2003 | Pommer et al. | 257/200 |

* cited by examiner

*Primary Examiner* — Daniel Petkovsek

(57) ABSTRACT

An optical data communication module, such as a transceiver, transmitter or receiver, has two parallel substrates with metal layers. An opto-electronic device between the substrates is shielded against electromagnetic interference by the metal layers and conductors, such as vias, which are distributed around a periphery of the opto-electronic device and connect the metal layers.

22 Claims, 21 Drawing Sheets

OPTICAL DATA COMMUNICATION MODULE HAVING EMI CAGE

BACKGROUND

In data communication systems, it is often useful to modularize interface electronics and other interface elements into a data communication module. For example, in an optical data communication system, an optical data transceiver module may include a light source such as a semiconductor laser, and a light detector such as a photodiode, and may also include driver and receiver circuitry associated with the laser and photodiode, as well as optical elements such lenses and reflective elements. The laser and associated circuitry convert electrical signals that the module receives via electrical contacts into optical signals that the module outputs via one or more optical fibers. The photodiode and associated circuitry convert optical signals received via the one or more optical fibers into electrical signals that the module outputs via the electrical contacts.

In one common type of optical transceiver module, an opto-electronic device (i.e., laser or photodiode) is mounted on a leadframe. Electrical contact pads on the opto-electronic device (die) are wire-bonded to contact pads on the leadframe. The leadframe, opto-electronic device, and wirebonds are then encapsulated in an optically transparent resin. This type of optical transceiver module is generally unsuitable for high-frequency operation (e.g., above 1 gigabit per second date rate) because the circuitry is susceptible to electromagnetic interference (EMI), which can adversely affect its operation.

Another common type of optical transceiver module, which is better suited for high data rates, includes a package commonly referred to as "TO" or "TO-can" due to its generally cylindrical shape. A TO-can package is characterized by a short cylindrical or can-shaped metal housing that provides EMI shielding. An outer metal EMI cage can be included around such a TO-can transceiver module to provide additional EMI shielding. An example of an optical transceiver module having such an outer metal EMI cage is a transceiver module of the family commonly known as Small Form Factor (SFF).

Optical transceiver modules of the SFF family may be too large or too uneconomical for some applications. It would be desirable to provide a small and economical optical transceiver module having EMI shielding.

SUMMARY

Embodiments of the present invention relate to an optical data communication module in which metal layers of two substantially planar substrates, such as printed circuit boards (PCBs), are electrically connected to each other by conductors, such as PCB vias, distributed around a periphery of an opto-electronic device mounted between the substrates, to provide shielding against electromagnetic interference. The opto-electronic device can be an opto-electronic transmitter (i.e., electrical-to-optical signal converter, such as a laser) or an opto-electronic receiver (i.e., an optical-to-electrical signal converter, such as a photodiode).

Each of the first and second planar substrates has a first surface and a second surface. The first planar substrate also an array of electrical contacts. The first surface of the first planar substrate has a metal layer. The second surface of the second planar substrate likewise has a metal layer. The opto-electronic device is mounted on the second surface of the first planar substrate. The opto-electronic device is electrically connected to signal conductors of the first planar substrate. At least some of these signal conductors are coupled to the array of electrical contacts.

The first surface of the second planar substrate has a recessed region or cavity that accommodates the opto-electronic device, i.e., the opto-electronic device extends into the cavity. A region of the first surface of the second planar substrate that surrounds the cavity abuts, i.e., is in contact with, the second surface of the first planar substrate. A plurality of conductors oriented normal to the first planar substrate and second planar substrate extends through the first planar substrate and through the second planar substrate and electrically connects the metal layer of the first surface of the first planar substrate to the metal layer of the second surface of the second planar substrate. The conductors are distributed around a periphery of the opto-electronic device. The structure comprising the metal layers connected by the conductors provides shielding against electromagnetic interference.

Either the first planar substrate or, alternatively, the second planar substrate has a bore or hole through it that extends to the opto-electronic device. An optical element, such as a lens or the end of an optical fiber, is at least partly disposed in the hole and optically aligned with the opto-electronic device.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

DETAILED DESCRIPTION

Figure 1:
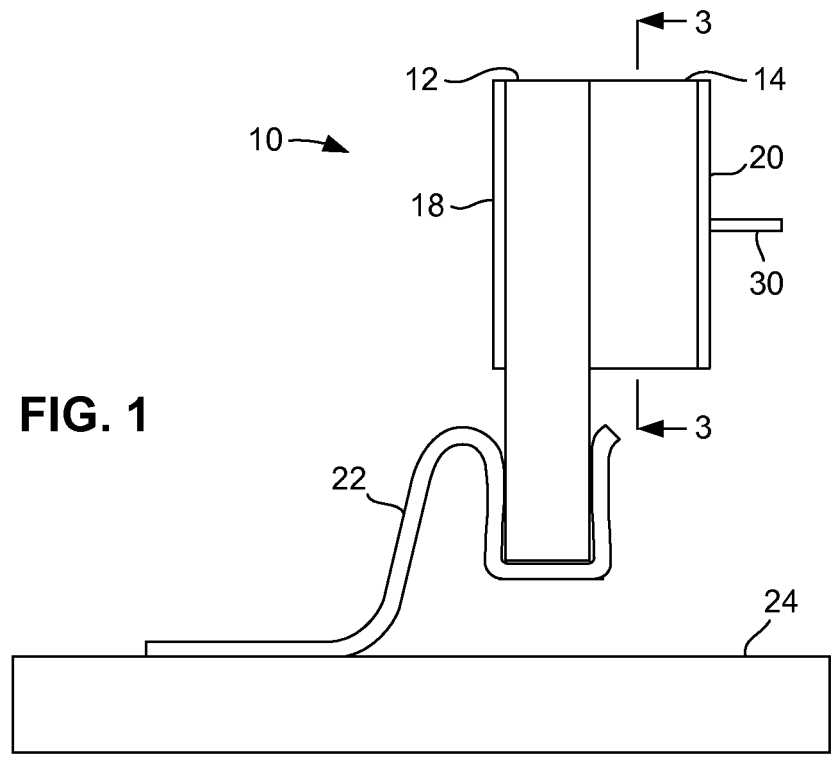
FIG. 1 is a side elevation view of an optical data communication module, in accordance with a first exemplary embodiment of the invention.
Figure 2:
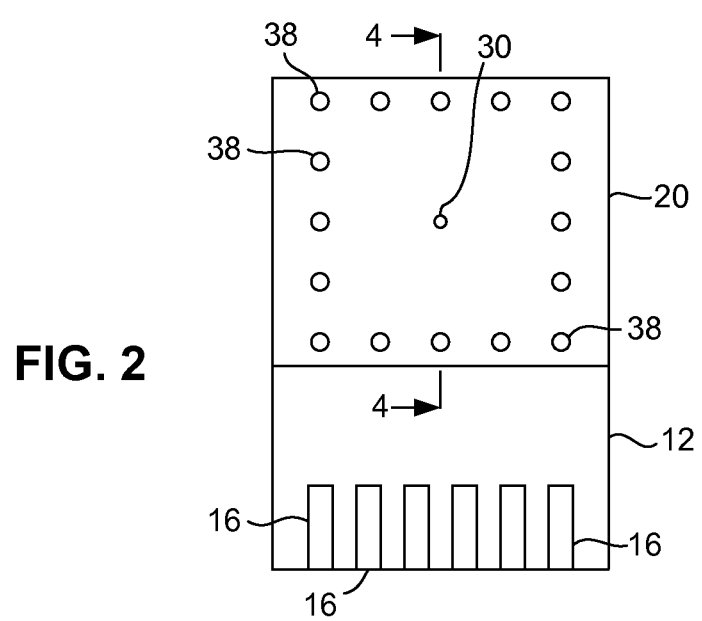
FIG. 2 is a front elevation view of a portion of the optical data communication module of FIG. 1.

As illustrated in FIG. 1, in an illustrative or exemplary embodiment of the invention, an optical data communication module 10 includes a first substrate 12, such as a printed circuit board (PCB), and a second substrate 14, such as another PCB. As illustrated in FIG. 2, first substrate 12 includes an array of electrical contacts 16. A first surface of first substrate 12 has a metal layer 18 (FIG. 1). A second surface of first substrate 12 abuts or is in contact with a first surface of second substrate 14. A second surface of second substrate 14 has a metal layer 20. Electrical contacts 16 make contact with fingers (not individually shown for purposes of clarity) near one end of a lead frame 22. Lead frame 22 has a bent shape to not only make electrical contact with electrical contacts 16 but also to mechanically retain first substrate 12. Surface-mount contacts (not shown for purposes of clarity) near another end of lead frame 22 are connected to electrical traces or similar conductors of a motherboard 24 or similar substrate, thereby electrically coupling first substrate 12 and motherboard 24. Alternatively, first substrate 12 can be electrically and mechanically coupled to mother board 24 in any other suitable manner, such as those described below with regard to other embodiments.

Figure 3:
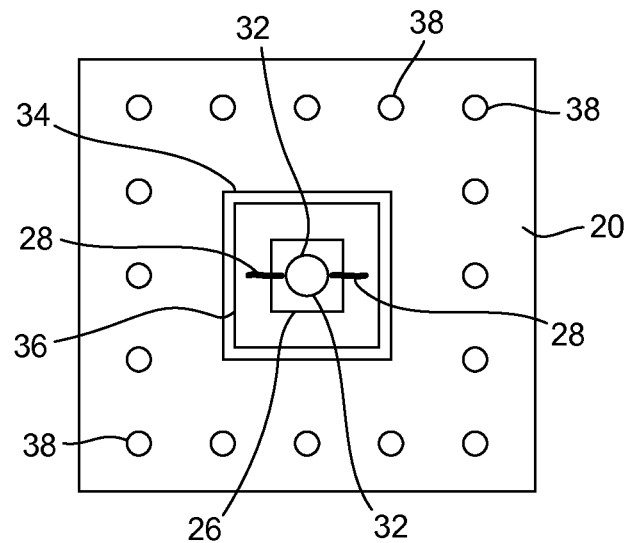
FIG. 3 is a sectional view taken along line 3-3 of FIG. 1.
Figure 4:
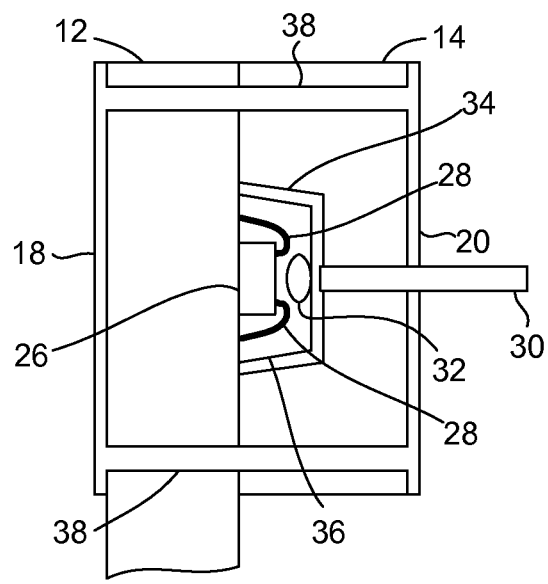
FIG. 4 is a sectional view taken along line 4-4 of FIG. 2.

As illustrated in FIGS. 3-4, an opto-electronic device 26, such as a transmitter (e.g., laser chip) or receiver (e.g., photodetector chip), is mounted on the second surface of first substrate 12. Opto-electronic device 26 is electrically connected to traces or similar conductors in first substrate 12 by bond wires 28. Note that first substrate 12 is a multi-layer structure having conductive traces or similar conductors on one or more internal layers. Opto-electronic device 26 can thus communicate electrical signals with the array of electrical contacts 16. In an instance in which opto-electronic device 26 is a transmitter, such as a laser chip, opto-electronic device 26 receives such electrical signals and converts them into corresponding optical signals, which opto-electronic device 26 emits generally along an optical axis normal to first and second substrates 12 and 14. An end of an optical fiber 30 is retained in a bore or hole through second substrate 14 and receives these optical signals through a lens 32 that focuses the light emitted by opto-electronic device 26 into the end of optical fiber 30. Alternatively, in an instance in which opto-electronic device 26 is a receiver, such as a photodiode chip, lens 32 collimates the light emitted from the end of optical fiber 30 onto opto-electronic device 26. For purposes of clarity, only one end of optical fiber 30 is shown. Nevertheless, it should be understood that optical fiber 30 can be used to communicate optical data signals with another system, such as a processing system or control system (not shown). Connector assemblies, such as those described below, can be included to facilitate coupling optical fiber 30 to such other systems.

Note that the first surface of second substrate 14 has a recessed region or cavity 34. Cavity 34 accommodates the height of opto-electronic device 26 and bond wires 28. Also, opto-electronic device 26 and bond wires 28 are encapsulated within a transparent overmold 36. Lens 32 can be retained within overmold 36. The bore or hole through which the end of optical fiber 30 extends thus terminates in cavity 34 and is aligned with the optical axis of opto-electronic device 26.

A number of conductors, such as PCB vias 38, extend between the first surface of first substrate 12 and the second surface of second substrate 14 and thus electrically couple metal layers 18 and 20 together. PCB vias 38 are distributed substantially evenly around cavity 34 and thus around the periphery of opto-electronic device 26. The combination of PCB vias 38 and metal layers 18 and 20, which are all electrically coupled together, can serve as a Faraday cage for shielding opto-electronic device 26 against electromagnetic interference (EMI).

Figure 5:
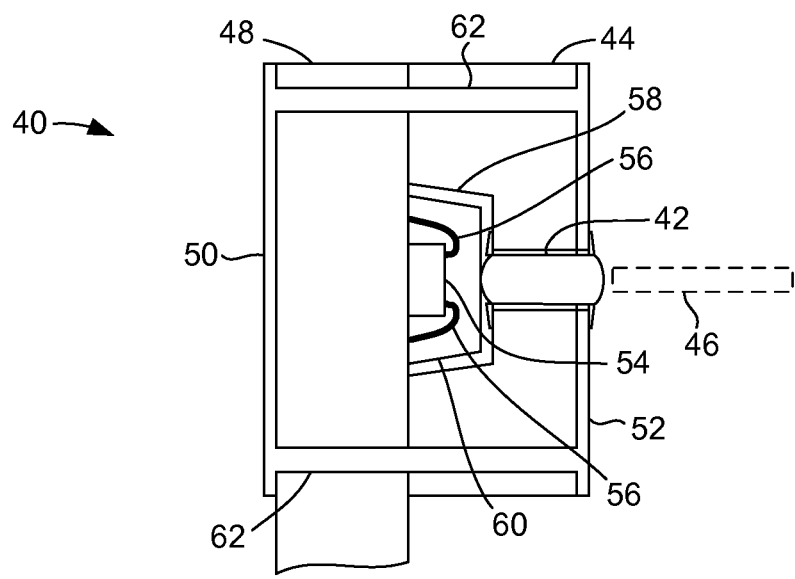
FIG. 5 is similar to FIG. 4, showing a second exemplary embodiment.

As illustrated in FIG. 5, in an embodiment similar to that described above with regard to FIGS. 1-4, an optical data communication module 40 has a lens 42 retained in the hole in the second substrate 44. An optical fiber 46 can be optically coupled to lens 40 (mechanical coupling structure not shown for purposes of clarity). The remaining aspects of optical data communication module 40 that are similar to those of above-described optical data communication module 10 are not described in similar detail. Although not shown for purposes of clarity, optical data communication module 40 can be connected to a motherboard or other substrate in the same manner described above with regard to optical data communication module 10 or in any other suitable manner, such as those described below with regard to other embodiments. Accordingly, it can be noted that optical data communication module 40 further includes: a first substrate 48 similar to above-described first substrate 20; a metal layer 50 on a first surface of first substrate 48 similar to above-described metal layer 18; a metal layer 52 on a second surface of second substrate 44 similar to above-described metal layer 20; an opto-electronic device 54 similar to above-described opto-electronic device 26; bond wires 56 that are similar to above-described bond wires 28; a cavity 58 similar to above-described cavity 34; an overmold 60 similar to above-described overmold 36; and PCB vias 62 that are similar to above-described PCB vias 38.

Figure 6:
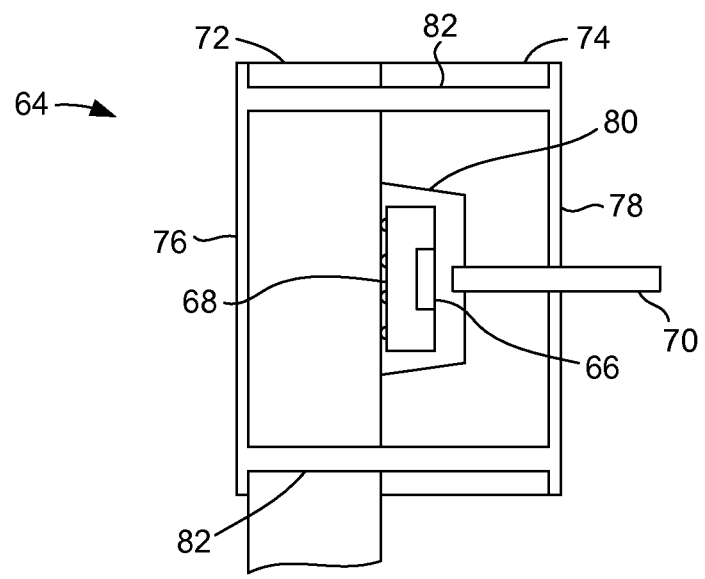
FIG. 6 is similar to FIGS. 4 and 5, showing third exemplary embodiment.

As illustrated in FIG. 6, in another embodiment similar to that described above with regard to FIGS. 1-4, an optical data communication module 64 has an opto-electronic device 66 mounted using an embedded wafer-level ball grid array (eWLB) package 68. As the manner in which an eWLB package can be used to mount a semiconductor device to a PCB is well understood in the art, such details are not described herein. Although not shown for purposes of clarity, optical data communication module 64 can be connected to a motherboard or other substrate in the same manner described above with regard to optical data communication module 10 or in any other suitable manner, such as those described below with regard to other embodiments. The remaining aspects of optical data communication module 64 that are similar to those of above-described optical data communication module 10 are not described in similar detail. Accordingly, can be noted that optical data communication module 64 further includes: an optical fiber 70 similar to above-described optical fiber 30; a first substrate 72 similar to above-described first substrate 20; a second substrate 74 similar to above-described second substrate 14; a metal layer 76 on a first surface of first substrate 72 similar to above-described metal layer 18; a metal layer 78 on a second surface of second substrate 74 similar to above-described metal layer 20; a cavity 80 similar to above-described cavity 34; and PCB vias 82 similar to above-described PCB vias 38.

Figure 7:
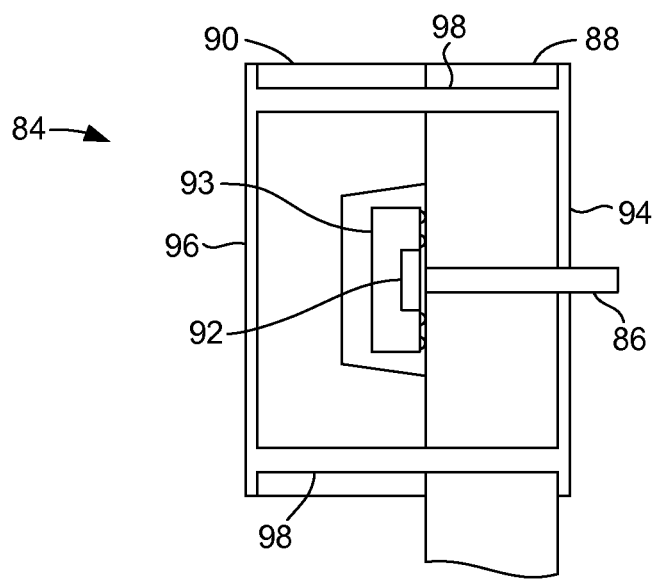
FIG. 7 is similar to FIGS. 4-6, showing a fourth exemplary embodiment.

As illustrated in FIG. 7, in another embodiment similar to that described above with regard to FIG. 6, an optical data communication module 84 has an optical fiber 86 that extends through a hole in the first substrate 88 rather than the second substrate 90. As in the above-described embodiment, optical data communication module 84 has an opto-electronic device 92 mounted to first substrate 88 using an eWLB package 93. Note that in this embodiment the optical signals are communicated through the side of eWLB package 93 having the ball grid array rather than the opposite side. That is, eWLB package 93 is of a bottom-emitting type rather than a top-emitting type. The remaining aspects of optical data communication module 84 that are similar to those of above-described optical data communication module 64 are not described in similar detail. Accordingly, it can be noted that optical data communication module 84 further includes: a metal layer 94 on a first surface of first substrate 88 similar to above-described metal layer 76; a metal layer 96 on a second surface of second substrate 90 similar to above-described metal layer 78; and PCB vias 98 similar to above-described PCB vias 38.

Figure 8:
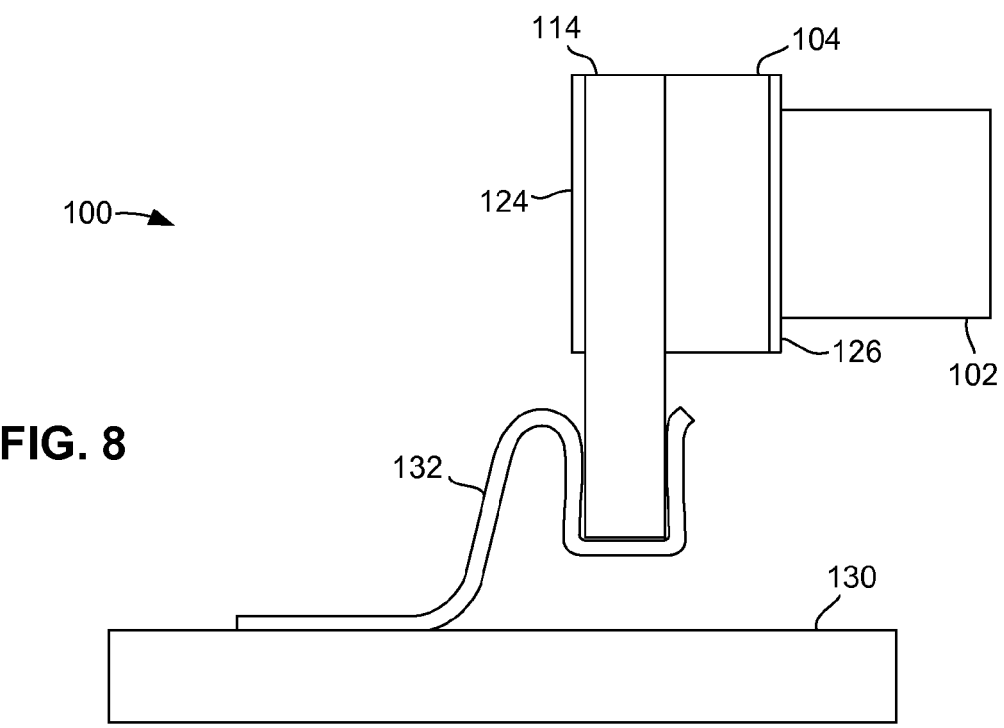
FIG. 8 is a side elevation view of an optical data communication module, in accordance with a fifth exemplary embodiment.
Figure 9:
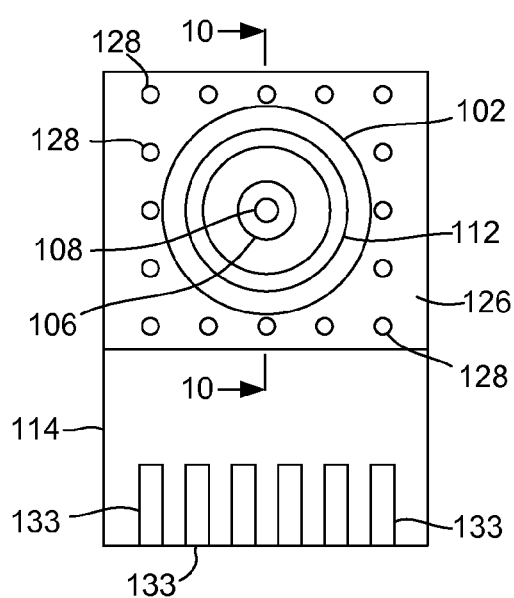
FIG. 9 is a front elevation view of the optical data communication module of FIG. 8.
Figure 10:
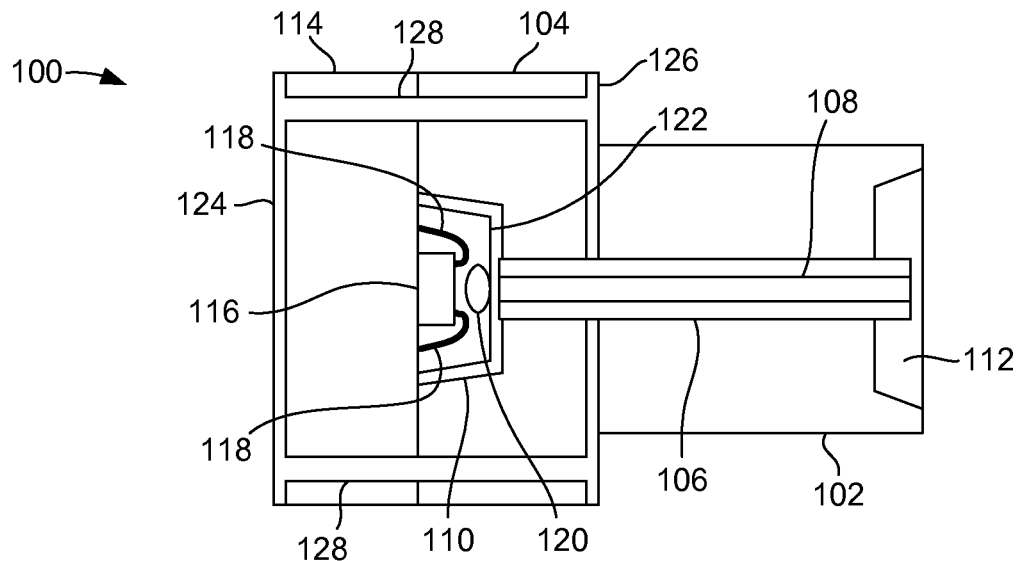
FIG. 10 is a sectional view taken along line 10-10 of FIG. 9.

As illustrated in FIGS. 8-10, in another embodiment similar to that described above with regard to FIGS. 1-4, an optical data communication module 100 has a barrel 102 that extends from the second surface of the second substrate 104. Concentrically retained in barrel 102 is a fiber pigtail assembly comprising a ferrule 106 and a length of optical fiber 108 retained within ferrule 106. In this embodiment, ferrule 106 extends through the hole in second substrate 104 into the cavity 110. The distal end of barrel 102 has a frusto-conical recess 112 that serves as an alignment feature in a manner described below. The remaining aspects of optical data communication module 100 that are similar to those of above-described optical data communication module 10 are not described in similar detail. Accordingly, it can be noted that optical data communication module 84 further includes: a first substrate 114 similar to above-described first substrate 12; an opto-electronic device 116 mounted in a manner similar to above-described opto-electronic device 26; bond wires 118 similar to above-described bond wires 28; a lens 120 similar to above-described lens 32; an overmold 122 similar to above-described overmold 36; a metal layer 124 on a first surface of first substrate 114 similar to above-described metal layer 76; a metal layer 126 on a second surface of second substrate 104 similar to above-described metal layer 78; and PCB vias 128 similar to above-described PCB vias 38. Also, optical data communication module 100 is mechanically and electrically connected to a motherboard 130 or other substrate through a leadframe 132 and an array of electrical contacts 133 on first substrate 114 in the same manner described above with regard to optical data communication module 10.

Figure 11:
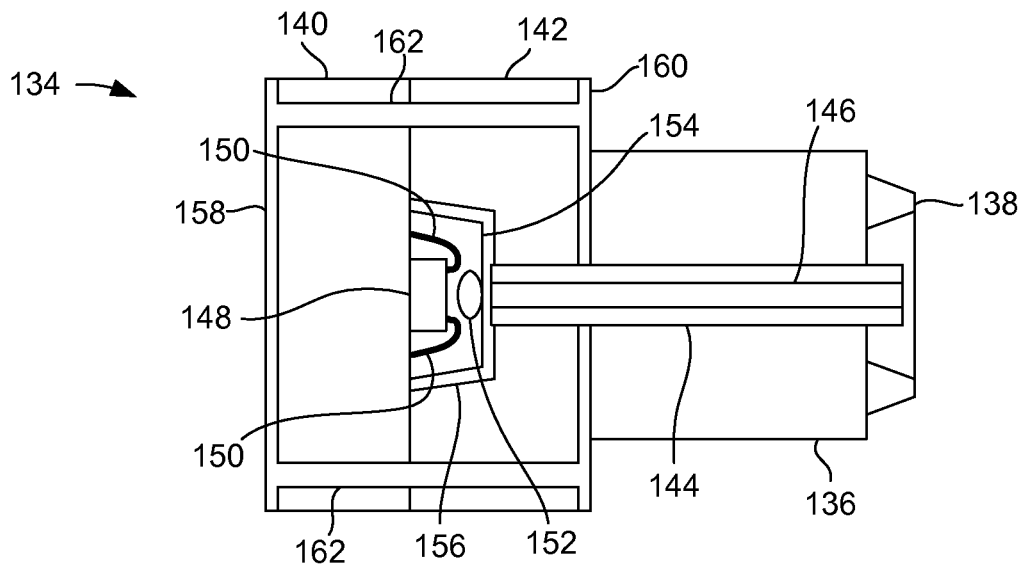
FIG. 11 is similar to FIG. 10, showing a sixth exemplary embodiment.

As illustrated in FIG. 11, in another embodiment similar to that described above with regard to FIG. 10, an optical data communication module 134 has a barrel 136 with a frusto-conical ring 138 at its distal end that serves as an alignment feature having a shape complementary to the shape of frusto-conical recess 112 (FIG. 10). Although not shown for purposes of clarity, optical data communication module 134 can be connected to a motherboard or other substrate in the same manner described above with regard to optical data communication module 100 or in any other suitable manner, such as those described below with regard to other embodiments. The remaining aspects of optical data communication module 134 that are similar to those of above-described optical data communication module 100 are not described in similar detail. Accordingly, can be noted that optical data communication module 134 includes: a first substrate 140 similar to above-described first substrate 114; a second substrate 142 similar to above-described second substrate 104; a fiber pigtail assembly comprising a ferrule 144 and a length of optical fiber 146 retained therein in a manner similar to the above-described fiber pigtail assembly; an opto-electronic device 148 mounted in a manner similar to above-described opto-electronic device 116; bond wires 150 similar to above-described bond wires 118; a lens 152 similar to above-described lens 120; an overmold 154 similar to above-described overmold 122; a cavity 156 similar to above-described cavity 110; a metal layer 158 on a first surface of first substrate 140 similar to above-described metal layer 124; a metal layer 160 on a second surface of second substrate 104 similar to above-described metal layer 126; and PCB vias 162 similar to above-described PCB vias 128.

Figure 12:
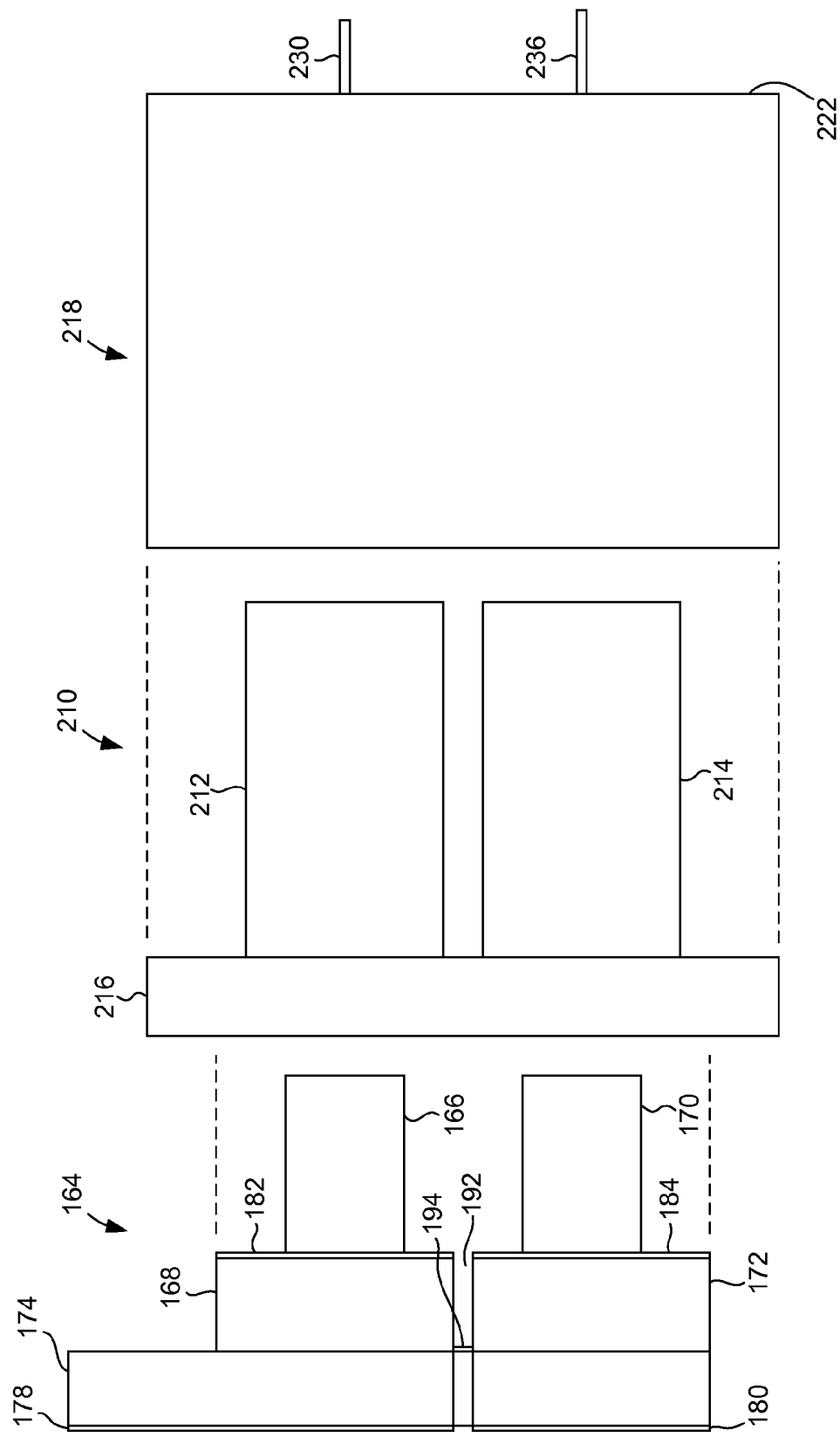
FIG. 12 is a top plan view illustrating the manner in which an optical data transceiver module, alignment tube structure and fiber plug are assembled into an optical data transceiver module assembly, in accordance with a seventh exemplary embodiment.

As illustrated in FIG. 12, in another exemplary embodiment, an optical data transceiver module 164 has a transmit portion defined by a transmit barrel 166 extending from a transmit second substrate 168, and a receive portion defined by a receive barrel 170 extending from a receive second substrate 172. Transmit second substrate 168 and receive second substrate 172 are each mounted to respective transmit and receive portions of a first substrate assembly 174 in the same manner described above with regard to other embodiments. Although not shown for purposes of clarity, an opto-electronic transmitter of the type described above with regard to other embodiments is mounted to a portion of first substrate assembly 174 that defines a transmit first substrate and accommodated by a cavity in a first surface of transmit second substrate 168. Similarly, although not shown for purposes of clarity, an opto-electronic receiver of the type described above with regard to other embodiments is mounted to another portion of first substrate assembly that defines a receive first substrate and accommodated by a cavity in a first surface of receive second substrate 172. The opto-electronic transmitter and opto-electronic receiver can be mounted and electrically connected in the same manner described above with regard to other embodiments.

A first surface of the transmit first substrate has a metal layer 178, and a first surface of the receive first substrate has a metal layer 180. A second surface of transmit second substrate 168 has a metal layer 182, and a second surface of receive second substrate 172 has a metal layer 184.

Figure 13:
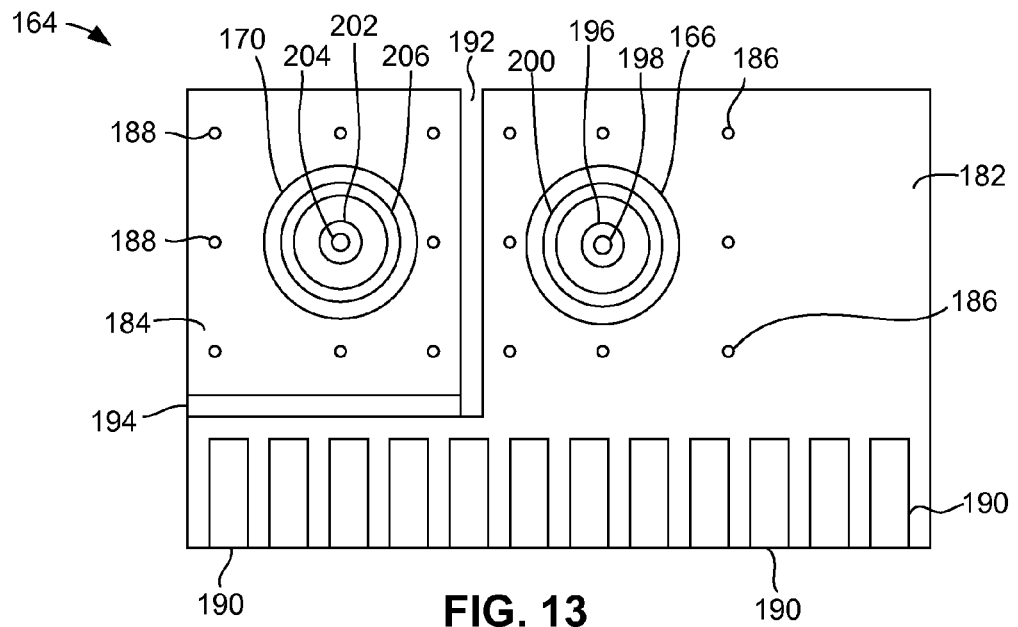
FIG. 13 is a front elevation view of the optical data transceiver module of FIG. 12.

With further reference to FIG. 13, PCB vias 186 are distributed around the region in which the opto-electronic transmitter (not shown) is mounted and electrically connect metal layers 178 and 182 together. Similarly, PCB vias 188 are distributed around the region in which the opto-electronic receiver (not shown) is mounted and electrically connect metal layers 180 and 184 together.

First substrate assembly 174 includes an array of electrical contacts 190. Although not shown for purposes of clarity, internal layers of first substrate assembly 174 include circuit traces that electrically couple the opto-electronic transmitter and opto-electronic receiver with respective groups of electrical contacts 190.

The transmit and receive portions are separated by a gap 192 that allows them the freedom to move or flex slightly with respect to each other to facilitate alignment, as described in further detail below with regard to the manner of assembly. The receive portion is connected to the transmit portion by a flexible foil strip 194 between first substrate assembly 174 and receive second substrate 172. Foil strip 194 allows the transmit and receive portions freedom of movement with respect to each other in certain directions while holding them together in other directions. Foil strip 194 also couples signal conductors between first substrate assembly 174 and receive second substrate 172.

Concentrically retained in transmit barrel 166 is a fiber pigtail assembly comprising a ferrule 196 and a length of optical fiber 198 retained within ferrule 196. The distal end of transmit barrel 166 has a frusto-conical recess 200 (similar to that described above with regard to FIG. 10) that serves as an alignment feature in a manner described below. Similarly, concentrically retained in receive barrel 170 is a fiber pigtail assembly comprising a ferrule 202 and a length of optical fiber 204 retained within ferrule 202. The distal end of receive barrel 170 has a frusto-conical ring 206 (similar to that described above with regard to FIG. 11) that serves as an alignment feature in the manner described below.

Figure 14:
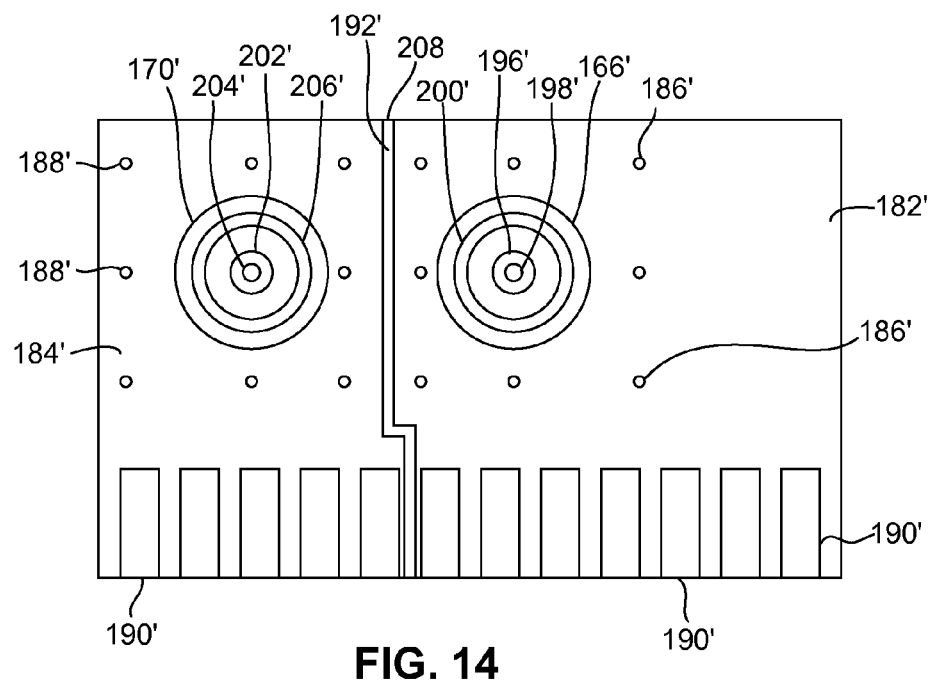
FIG. 14 is similar to FIG. 13, showing an eighth exemplary embodiment.

As illustrated in FIG. 14, in another embodiment similar to that described above with regard to FIG. 13, instead of the above-described combination of gap 192 and foil strip 94 there is the combination of a gap 192' and a flexible foil 208. Flexible foil 208 is adhered to the first surfaces of the transmit first substrate and receive first substrate of first substrate assembly 174. That is, flexible foil 208 spans the surface of first substrate assembly and holds the transmit and receive portions together in certain directions while allowing freedom of movement in other directions to facilitate assembly. As the remaining features of this embodiment are identical to those of the embodiment described above with regard to FIG. 13, such features are not described herein in similar detail. Accordingly, it can be noted that: transmit barrel 166' and receive barrel 170' are identical to the above-described transmit barrel 166 and receive barrel 170, respectively; PCB vias 186' and 188' are identical to the above-described PCB vias 186 and 188, respectively; an array of electrical contacts 190' is identical to the above-described array of electrical contacts 190; a ferrule 196' and an optical fiber 198' are identical to the above-described ferrule 196 and optical fiber 198; a frusto-conical recess 200' is identical to the above-described frusto-conical recess 200; a ferrule 202' and an optical fiber 204' are identical to the above-described ferrule 202 and optical fiber 204; and a frusto-conical ring 206' is identical to the above-described frusto-conical ring 206.

Figure 15:
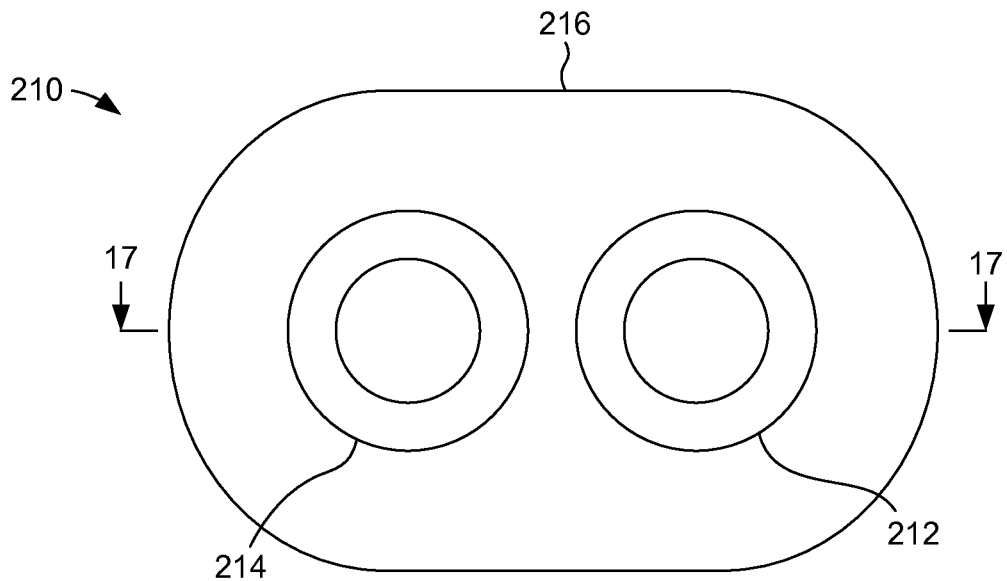
FIG. 15 is an end elevation view of the optical data transceiver module of FIG. 12.
Figure 16:
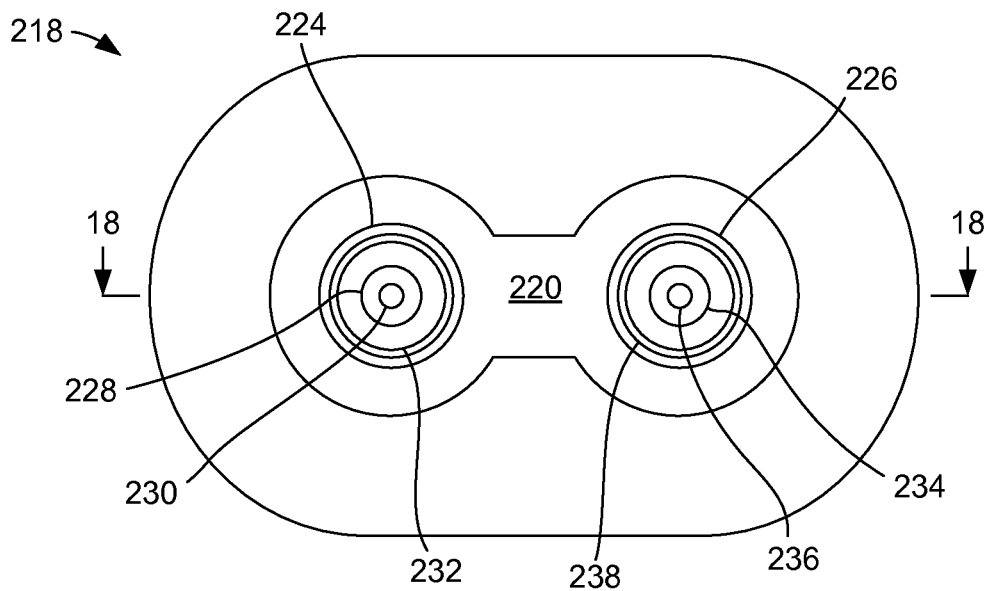
FIG. 16 is an end elevation view of the fiber plug of FIG. 12.
Figure 17:
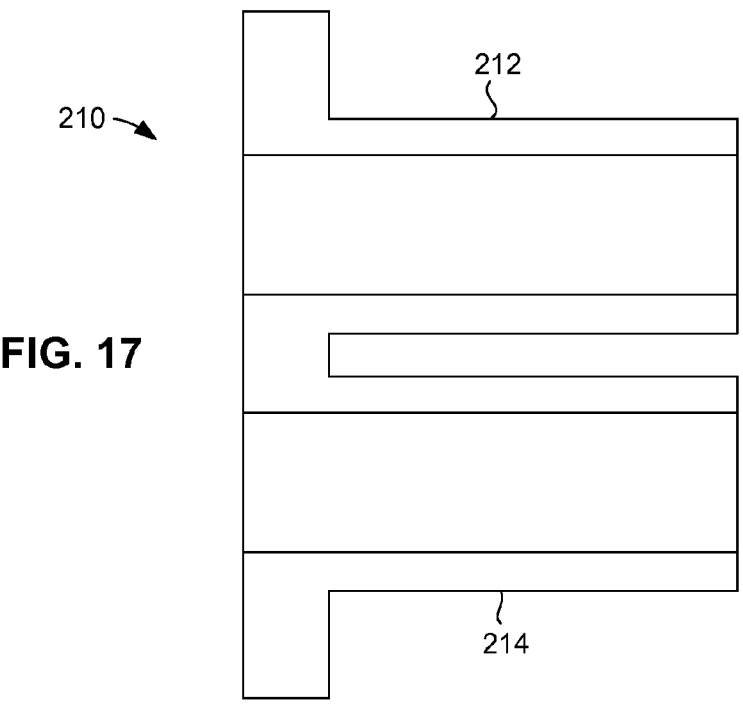
FIG. 17 is a sectional view taken along line 17-17 of FIG. 15.

Referring again to FIG. 12, and further to FIGS. 15 and 17, optical data transceiver module 164 is mateable with an alignment tube structure 210 having a transmit alignment tube 212 connected to a receive alignment tube 214 through a neck plate 216. To mate optical data transceiver 164 with alignment tube structure 210, transmit barrel 166 is inserted into one end of transmit alignment tube 212, while receive barrel 170 is inserted into one end of receive alignment tube 214. Transmit alignment tube 212 and receive alignment tube 214 have inside diameters that accommodate the outside diameters of transmit barrel 166 and receive barrel 170, respectively. The above described flexibility or freedom of movement of transmit barrel 166 and receive barrel 170 facilitate their insertion into alignment tube structure 210 in proper alignment. With still further reference to FIGS. 16 and 18, alignment tube structure 210 is, in turn, mateable with a fiber plug 218. Fiber plug 218 has a cavity 220 with an oblong cross-sectional shape that accommodates transmit alignment tube 212 and receive alignment tube 214. That is, the width of cavity 220 accommodates the outside diameters of transmit alignment tube 212 and receive alignment tube 214. Extending from a base portion 222 of fiber plug 218 within cavity 220 are a (plug) transmit barrel 224 and a (plug) receive barrel 226. To assemble or mate alignment tube structure 210 with fiber plug 218, transmit alignment tube 212 and receive alignment tube 214 are inserted into cavity 220 in alignment with (plug) transmit barrel 224 and (plug) receive barrel 226, respectively.

Figure 18:
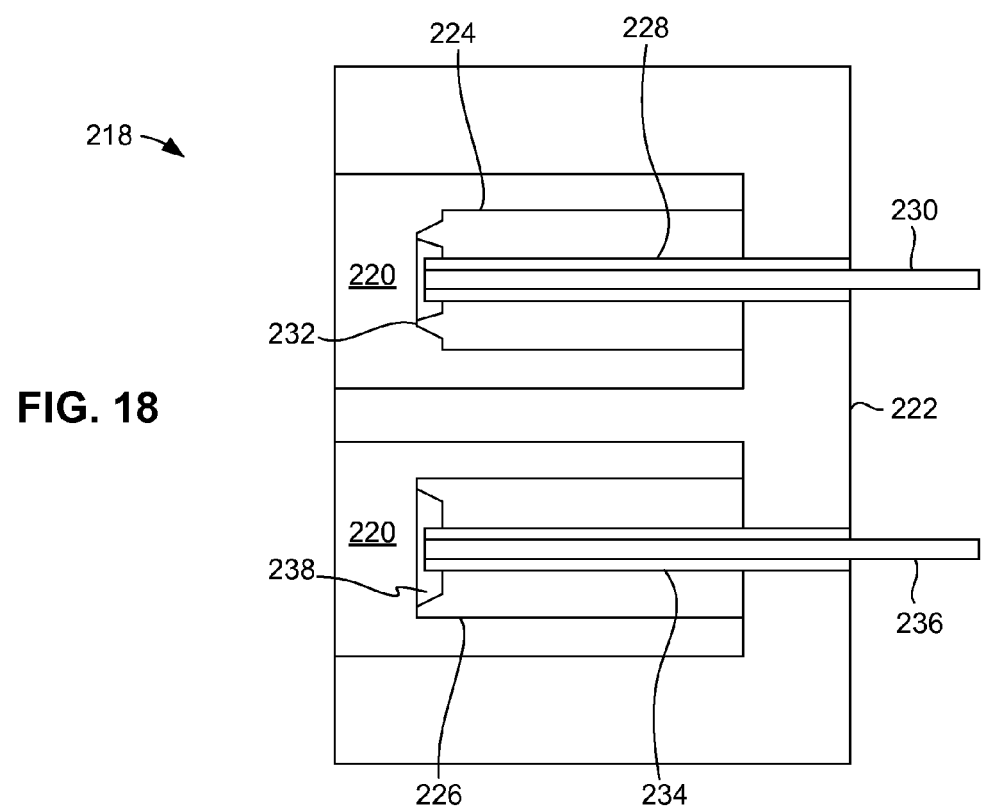
FIG. 18 is a sectional view taken along line 18-18 of FIG. 16.

As illustrated in FIG. 18, concentrically retained in (plug) transmit barrel 224 is a fiber pigtail assembly comprising a ferrule 228 and an optical fiber 230 retained within ferrule 228. The distal end of (plug) transmit barrel 224 has a frusto-conical ring 232 (similar to that described above with regard to FIG. 11) that serves as an alignment feature in the manner described below. Similarly, concentrically retained in (plug) receive barrel 226 is a fiber pigtail assembly comprising a ferrule 234 and an optical fiber 236 retained within ferrule 234. The distal end of (plug) receive barrel 226 has a frusto-conical recess 238 (similar to that described above with regard to FIG. 10) that serves as an alignment feature in the manner described below.

Figure 19:
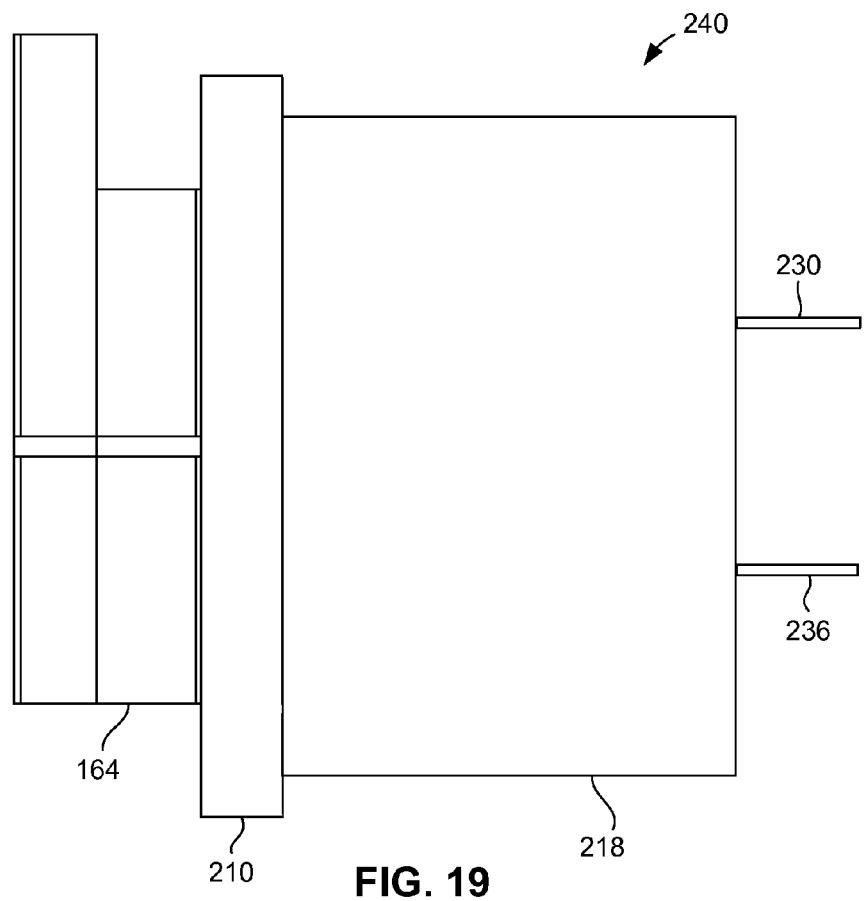
FIG. 19 is a top plan view of the fully assembled optical data transceiver module assembly of FIG. 12.
Figure 20:
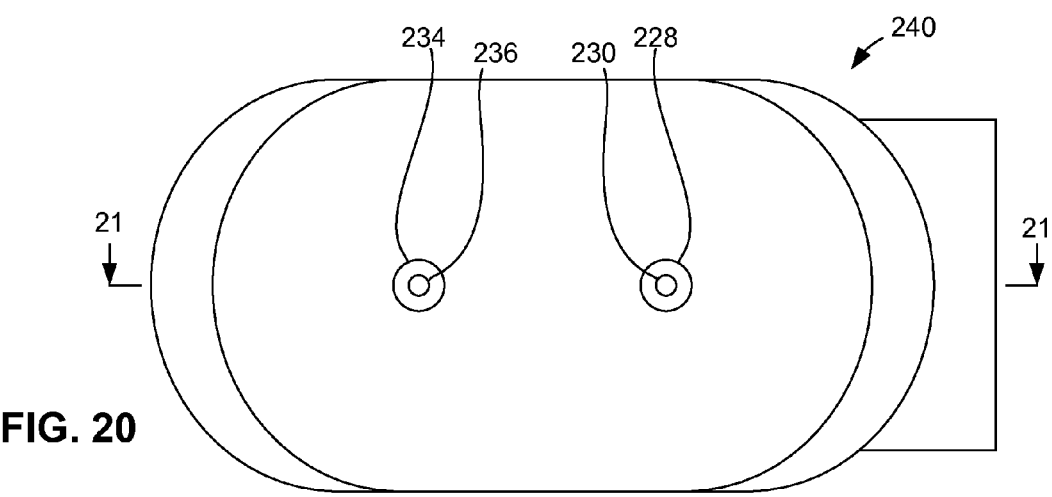
FIG. 20 is an end elevation view of the fully assembled optical data transceiver module assembly of FIG. 12.
Figure 21:
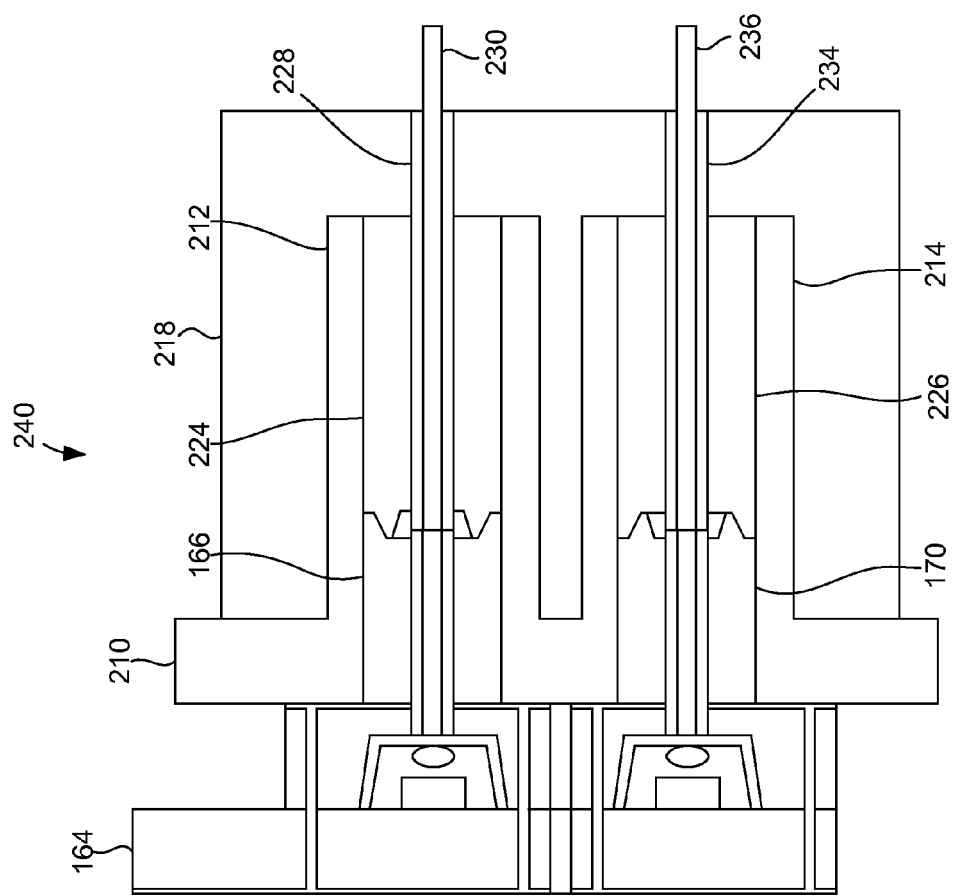
FIG. 21 is a sectional view taken along line 21-21 of FIG. 20.

The transceiver assembly 240 illustrated in FIGS. 19-21 reflects the fully-mated arrangement of optical data transceiver module 164, alignment tube structure 210, and fiber plug 218. In the fully mated arrangement, the (module) transmit and receive barrels 166 and 170 are fully received within the first ends of transmit and receive alignment tubes 212 and 214, respectively, and the second ends of transmit and receive alignment tubes 212 and 214 are fully received within cavity 220 of fiber plug 218. As illustrated in FIG. 21, in the fully mated arrangement, the frusto-conical ring of (module) receive barrel 170 is seated within the complementary frusto-conical recess of (plug) receive barrel 226, and the frusto-conical ring of (plug) transmit barrel 224 is seated within the complementary frusto-conical recess of (module) transmit barrel 166. This seating of elements having complementary frusto-conical shapes aids alignment of (module) transmit barrel 166 with (plug) transmit barrel 224 and alignment of (module) receive barrel 170 with (plug) receive barrel 226.

Figure 22:
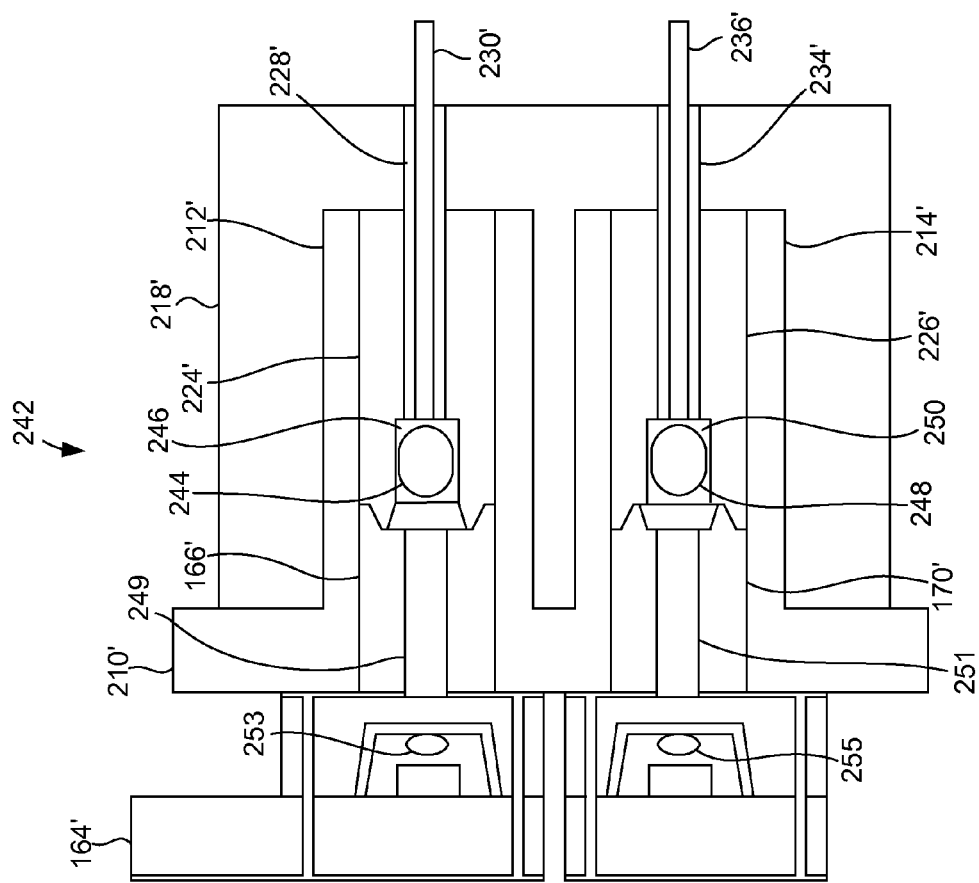
FIG. 22 is similar to FIG. 21, showing a ninth exemplary embodiment.

As illustrated in FIG. 22, in another embodiment similar to that described above with regard to FIG. 21, a transceiver assembly 242 includes a lens 244 mounted in a cavity 246 in a (plug) transmit barrel 224' and another lens 248 mounted in a cavity 250 in a (plug) receive barrel 226'. Instead of fiber pigtails as described above with regard to FIGS. 10-11, the (module) transmit barrel 166' and (module) receive barrel 170' have only holes or bores 249 and 251, respectively. Optical power is coupled directly from the transmitter lens 253 to lens 249 and from lens 248 to the receiver lens 255. Other features of this embodiment can be identical to those described above with regard to transceiver assembly 240 (FIG. 21). Accordingly, it can be noted that transceiver assembly 242 includes a transceiver module 164' identical to above-described transceiver module 164, and an alignment tube structure 210' identical to above-described alignment tube structure 210. Thus, alignment tube structure 210' includes a transmit alignment tube 212' identical to above-described transmit alignment tube 212 and a receive alignment tube 214' identical to above-described receive alignment tube 214. Furthermore, transceiver module 164' includes a (module) transmit barrel 166' identical to above-described (module) transmit barrel 166 and a (module) receive barrel 170' identical to above-described (module) receive barrel 170. Except for lenses 244 and 248 and cavities 246 and 250, the fiber plug 218' is identical to above-described fiber plug 218. Thus, (plug) transmit barrel 224' includes a ferrule 228' and optical fiber 230', and (plug) receive barrel 226' includes a ferrule 234' and optical fiber 236'.

Figure 23:
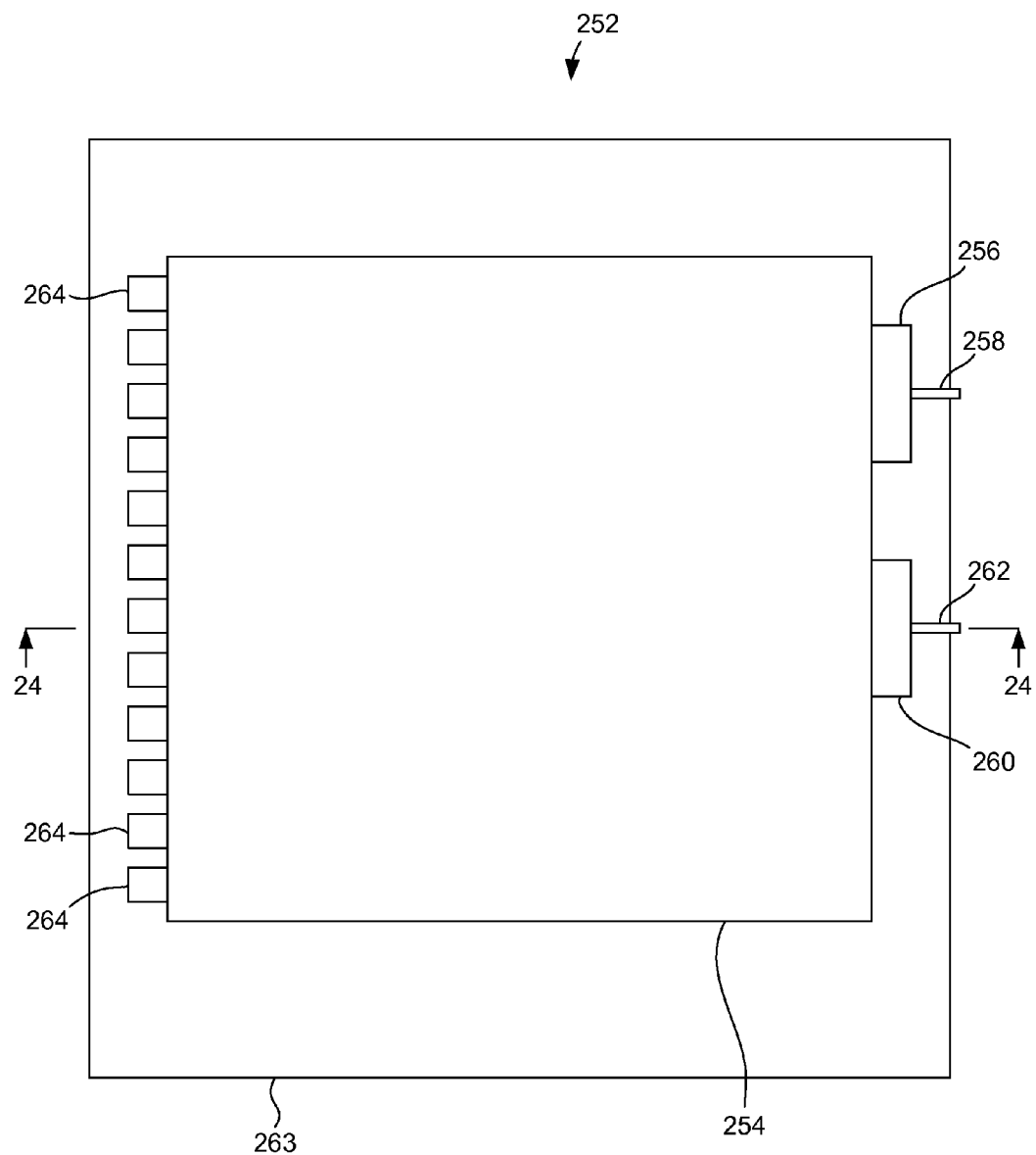
FIG. 23 is a top plan view of an optical data transceiver module, in accordance with a tenth exemplary embodiment.

As illustrated in FIG. 23, in another exemplary embodiment, an optical data transceiver module 252 has a housing 254. Optical data transceiver module 252 interfaces with a receive plug 256 having an optical fiber 258 and a transmit plug 260 having an optical fiber 262. Optical data transceiver module 252 also includes an array of electrical contacts 264 that can be surface-mounted on the surface of a motherboard 263.

Figure 24:
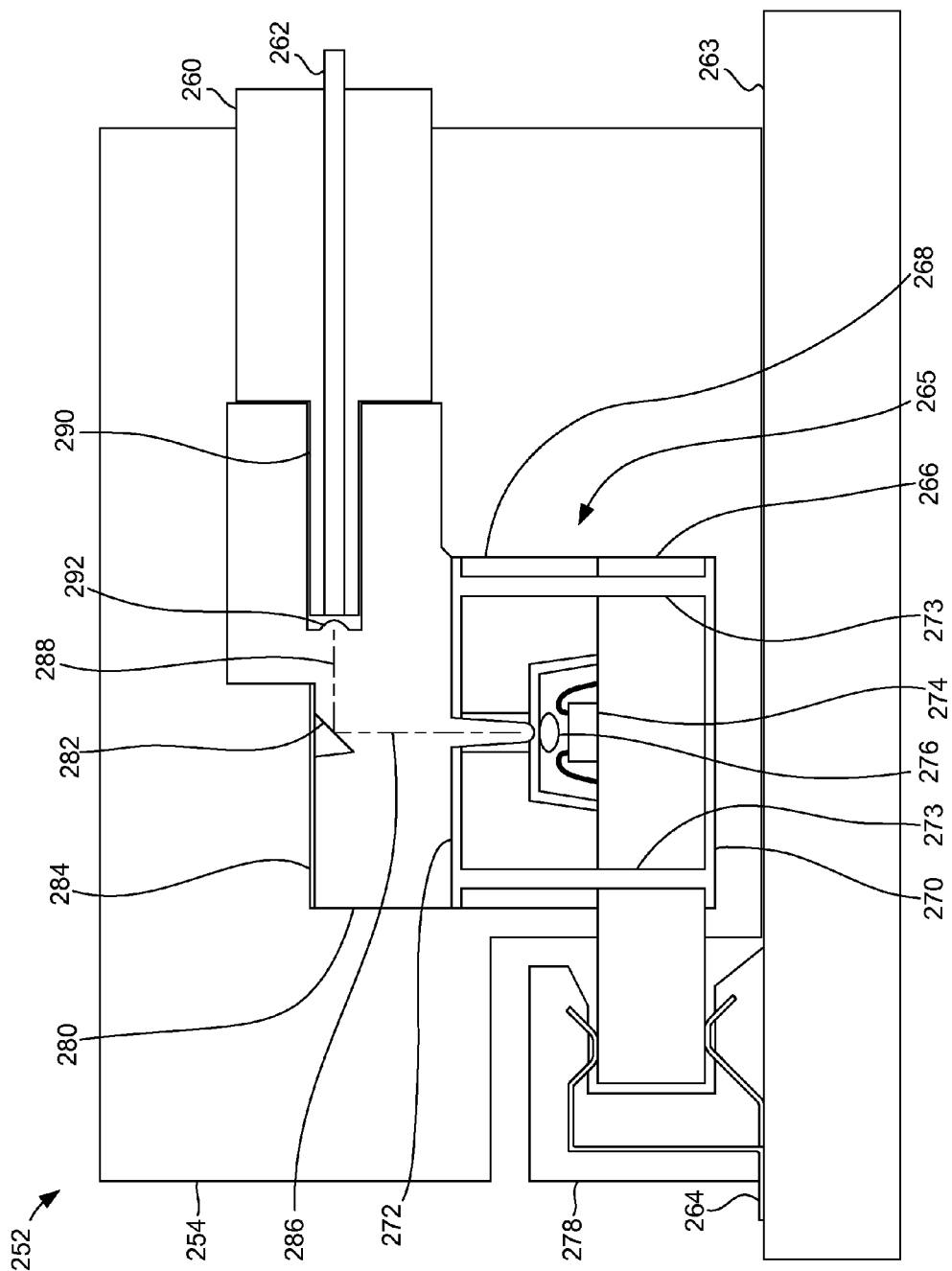
FIG. 24 is a sectional view taken along line 24-24 of FIG. 23.

As illustrated in FIG. 24, optical data transceiver module 252 further includes a transceiver 265 similar to those described above with regard to other embodiments. For purposes of clarity, only the transmitter portion of transceiver 265 is shown in FIG. 24. The transmitter portion includes the following elements that are similar to those described above with regard to other embodiments and therefore not described in similar detail herein: a first substrate 266; a second substrate 268; a metal layer 270 on the first surface of first substrate 266; a metal layer 272 on the second surface of second substrate 268; PCB vias 273; an opto-electronic transmitter 274 (e.g., laser chip) mounted on a second surface of first substrate 266 and extending into a cavity in second substrate 268; and a lens 276. As the combination of metal layers 270 and 272 and PCB vias 273 provide EMI shielding in the manner described above, housing 254 need not be made of metal or otherwise shielded. Portions of the array of electrical contacts 264 are contained within a connector housing 278 that receives an end of first substrate 266 having a corresponding array of electrical contacts (not shown). When the end of first substrate 266 is plugged into connector housing 278 in this manner, the electrical contacts of first substrate 266 make contact with corresponding ones of electrical contacts 264.

An optics block 280 made of a material transparent to the wavelength of the optical signal emitted by transmitter 274 is mounted on the second surface of second substrate 268. An example of a suitable material from which optics block 280 can be made is a material from the well-known family of amorphous thermoplastic polyetherimide resins produced by SABIC Corporation of Saudi Arabia (formerly General Electric Plastics Division) under the brand name ULTEM. Molded unitarily with the remainder of optics block 280 is a reflective surface 282. A protective film 284 covers reflective surface 282. In operation, the optical transmit signal emitted by transmitter 274 propagates along a transmit path (indicated by axis 286) and is incident on reflective surface 282, which reflects the optical signal along another portion of the transmit path (indicated by axis 288). Axis 288 is aligned with a fiber port 290 in optics block 280. A portion of transmit plug 260 extends into fiber port 290. A lens 292 focuses the optical transmit signal into fiber port 290 and thus into the end of optical fiber 262 retained in the portion of transmit plug 260 in fiber port 290.

Although not shown for purposes of clarity, the receiver portion of transceiver module 252 is configured in a manner similar to the above-described transmitter portion of optical data transceiver module 252, including a reflective surface in optics block 280 disposed in a receive path. Thus, in operation, the optical receive signal emitted by the end of optical fiber 258 into another fiber port in optics block 280 is reflected toward a receiver (e.g., photodiode) of optical data transceiver module 252.

Figure 25:
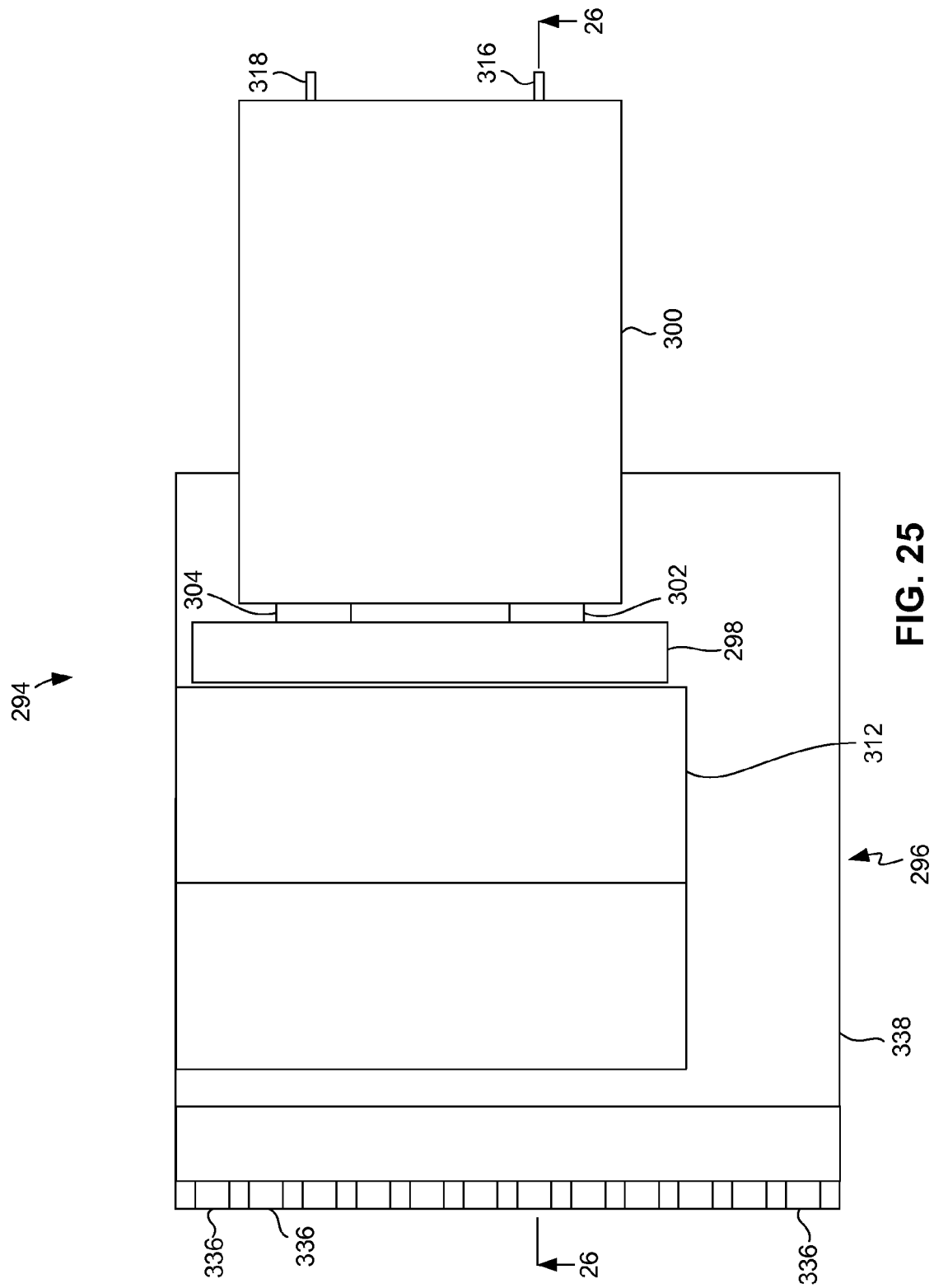
FIG. 25 is a top plan view of the optical data transceiver module of FIG. 23 assembled to a fiber plug and alignment tube structure.
Figure 26:
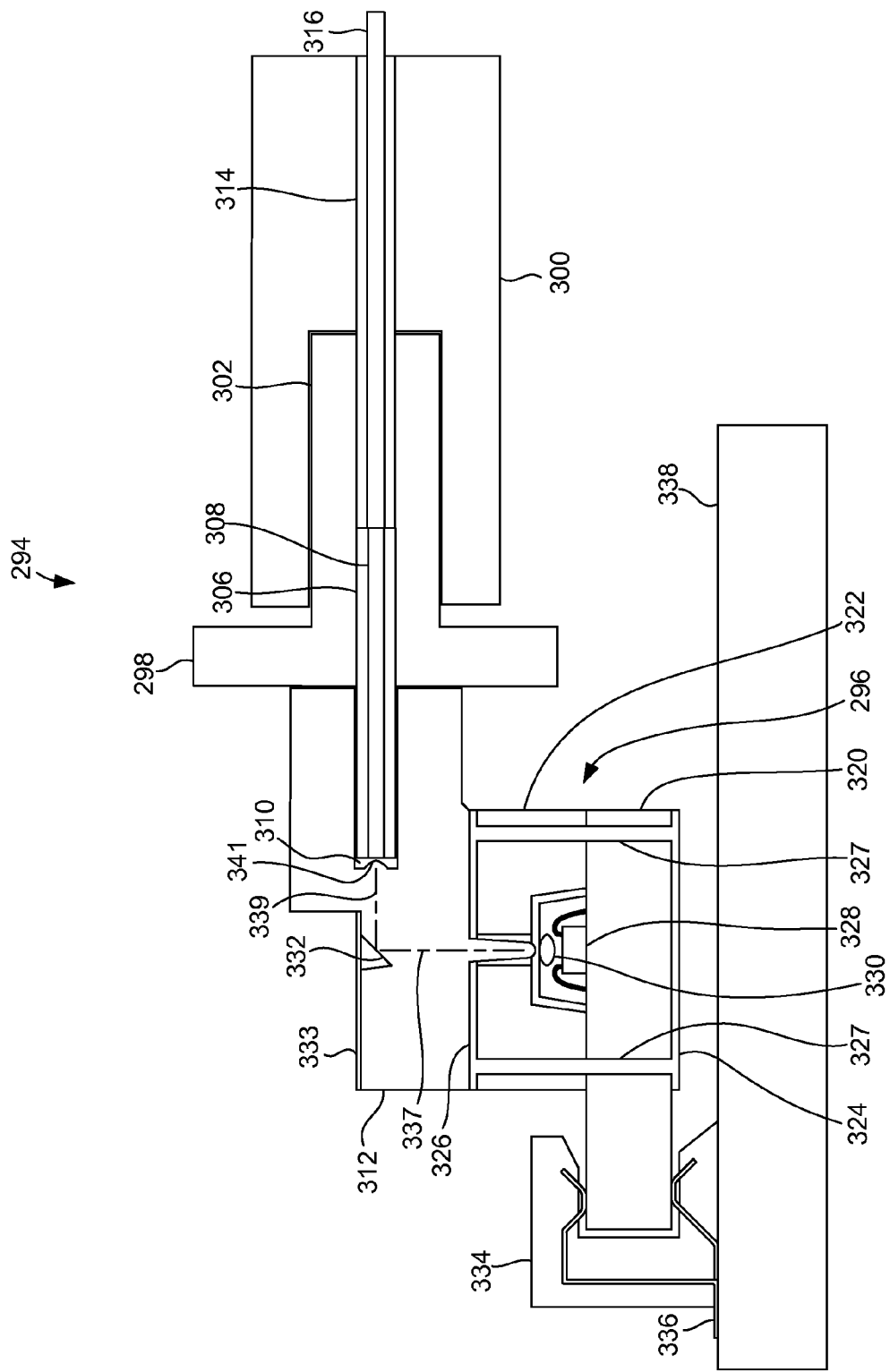
FIG. 26 is a sectional view taken along line 26-26 of FIG. 25.

As illustrated in FIGS. 25-26, in another embodiment, a transceiver assembly 294 includes an optical data transceiver module 296 that can be similar to above-described optical data transceiver module 252, an alignment tube structure 298 that can be similar to above-described alignment tube structure 210, and a fiber plug 300 that can be similar to above-described fiber plug 218. Although optical data transceiver module 296 is shown without a housing, it can alternatively include a housing similar to above-described housing 254. Alignment tube structure 298 includes a transmit alignment tube 302 and a receive alignment tube 304. In this embodiment, transmit alignment tube 302 has a pigtail assembly comprising a ferrule 306 with a length of optical fiber 308 retained within ferrule 306. A forward end of alignment tube structure 298 is mateable with transceiver module 296. In the fully mated position, ferrule 306 is received within a fiber port 310 of an optics block 312 of optical data transceiver module 296. A rearward end of alignment tube structure 298 is mateable with fiber plug 300. In the fully mated position, the rearward end of transmit alignment tube 302 is received within a cavity in fiber plug 300. Fiber plug 300 includes a ferrule 314 that retains an end of a transmit optical fiber 316. When alignment tube structure 298 is fully mated with transceiver module 296, the end of transmit optical fiber 316 is optically coupled with the end of optical fiber 308. Although not shown for purposes of clarity, the receiver portion of transceiver module 296 is configured in a manner similar to the above-described transmitter portion. Although not shown for purposes of clarity, alignment tube structure 298 and fiber plug 300 have features similar to those described above to facilitate coupling an optical receive signal from an optical fiber 318 (FIG. 25) to the receiver portion of optical data transceiver module 296.

The transmitter portion of optical data transceiver module 296 includes the following elements that are similar to those described above with regard to other embodiments and therefore not described in similar detail herein: a first substrate 320; a second substrate 322; a metal layer 324 on the first surface of first substrate 320; a metal layer 326 on the second surface of second substrate 322; PCB vias 327; a transmitter 328 (e.g., laser chip) mounted on a second surface of first substrate 320 and extending into a cavity in second substrate 322; and a lens 330. Optics block 312 includes a reflective surface 332 that operates in the same manner described above with regard to the embodiment illustrated in FIG. 24. A protective film 333 covers reflective surface 332. An end of first substrate 320 having an array of electrical contacts (not shown) is retained in a connector housing 334. These electrical contacts make contact with a corresponding array of electrical contacts 336 that are contained partly within connector housing 334 and thereby enable electrical signals to be communicated between first substrate 320 and conductive traces of a motherboard 338. In operation, the optical transmit signal emitted by transmitter 328 propagates along a transmit path (indicated by axis 337) and is incident on reflective surface 332. Reflective surface 332 reflects the optical signal along another portion of the transmit path (indicated by axis 339). A lens 341 in optics block 312 is aligned along axis 339 and focuses the reflected optical signal into the end of optical fiber 308 in fiber port 310.

Although not shown for purposes of clarity, the receiver portion of optical data transceiver module 296 is configured in a manner similar to the above-described transmitter portion of optical data transceiver module 296, including a reflective surface in optics block 312 disposed in a receive path. Thus, in operation, the optical receive signal emitted by the end of optical fiber 318 into another fiber port in optics block 312 is reflected toward a receiver (e.g., photodiode) of optical data transceiver module 296.

Figure 27:
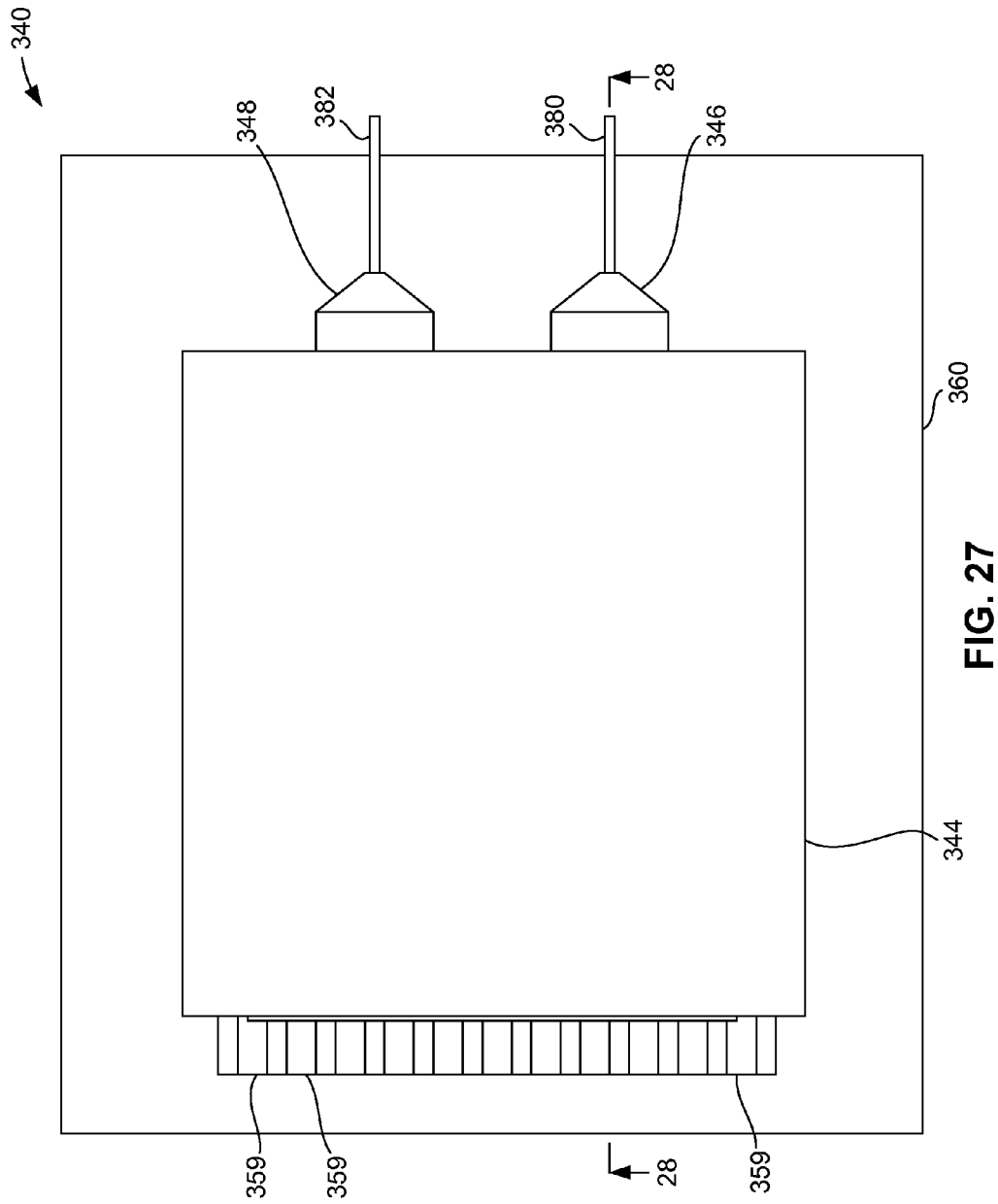
FIG. 27 is a top plan view of an optical data transceiver module, in accordance with an eleventh exemplary embodiment.
Figure 28:
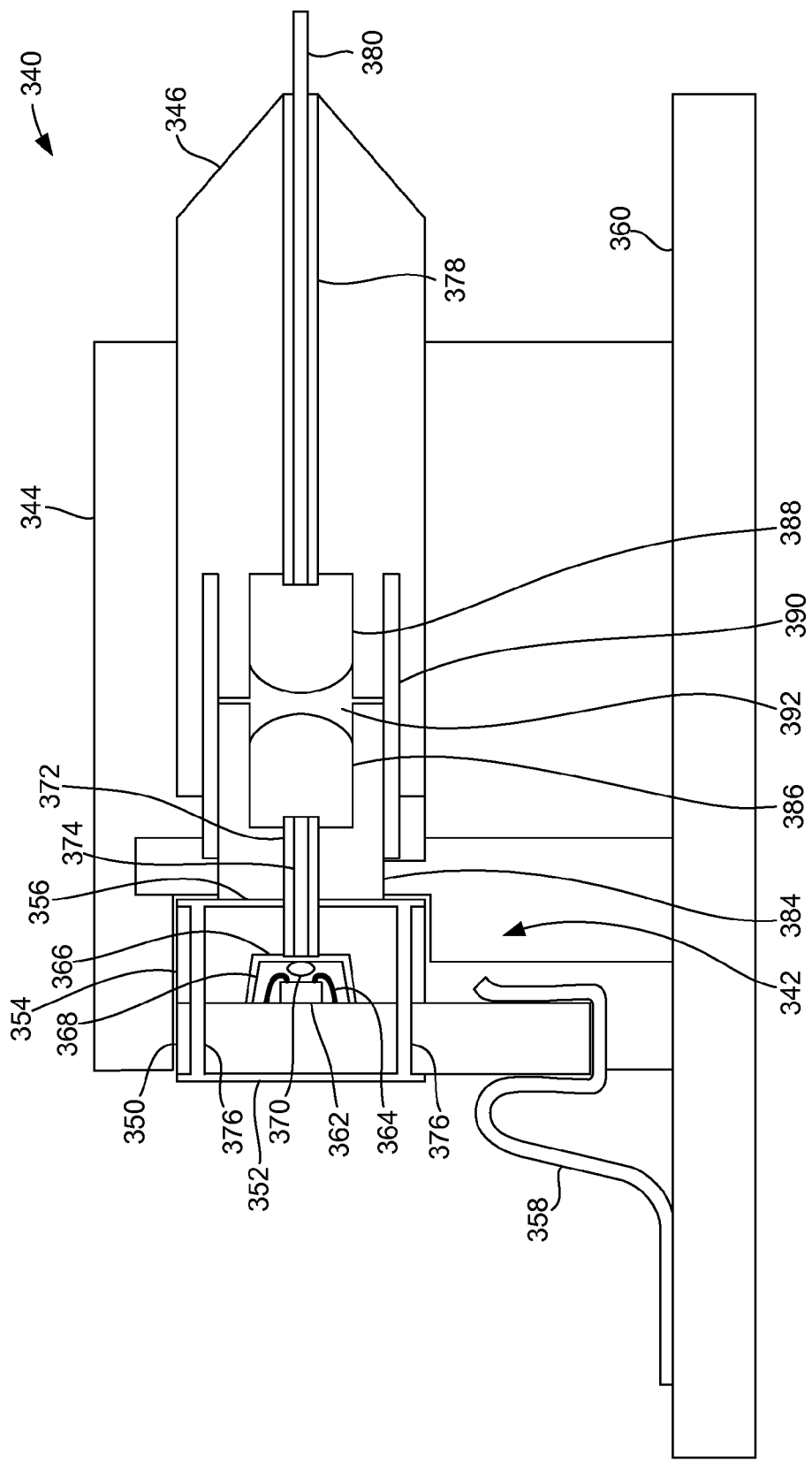
FIG. 28 is a sectional view taken along line 28-28 of FIG. 27.

As illustrated in FIGS. 27-28, in another embodiment, a transceiver assembly 340 includes an optical data transceiver module 342, a housing 344, a transmit fiber plug 346 and a receive fiber plug 348. As in other embodiments described above, optical data transceiver module 342 includes a first substrate 350 having a metal layer 352 on its first surface and a second substrate 354 having a metal layer 356 on its second surface. The second surface of first substrate 350 and first surface of second substrate 354 contact or abut each other. As in other embodiments described above, electrical contacts (not shown for purposes of clarity) on first substrate 350 make contact with fingers (not shown for purposes of clarity) near one end of a lead frame 358. Lead frame 358 has a bent shape to not only make electrical contact with first substrate 350 but also to mechanically retain first substrate 350. Surface-mount contacts 359 near another end of lead frame 358 are connected to electrical traces or similar conductors of a motherboard 360 or similar substrate, thereby electrically coupling first substrate 350 and motherboard 360.

As in other embodiments described above, an opto-electronic transmitter 362 (e.g., laser chip) is mounted on the second surface of first substrate 350. Opto-electronic transmitter 362 is electrically connected to traces or similar conductors in first substrate 350 by bond wires 364. A cavity 366 accommodates the height of opto-electronic transmitter 362 and bond wires 364. Opto-electronic transmitter 362 and bond wires 364 are encapsulated within a transparent overmold 368. A lens 370 is retained within overmold 368. A fiber pigtail assembly comprising a ferrule 372 and a length of optical fiber 374 retained in ferrule 372 has an end extending into cavity 366 to opto-electronic transmitter 362 through a hole in second substrate 354. An array of PCB vias 376 distributed around opto-electronic transmitter 362 electrically couple metal layers 352 and 356 together in the manner described above with regard to other embodiments.

Transmit fiber plug 346 is mateable with optical data transceiver module 342 by plugging transmit fiber plug into an opening or port in housing 344. Transmit fiber plug 346 has a ferrule 378 that retains a transmit optical fiber 380. Receive fiber plug 348 carries a receive optical fiber 382 (FIG. 27) in the same manner.

The end of ferrule 372 opposite the end that extends into cavity 366 extends through a barrel structure 384 into a cylindrical recess in the end portion of barrel structure 384. An end portion of transmit fiber plug 346 abuts this end of barrel structure 384 and similarly has a cylindrical recess. Lenses 386 and 388 are retained in the respective cylindrical recesses of these ends portions of barrel structure 384 and transmit fiber plug 346. An alignment tube 390 spans these end portions of barrel structure 384 and transmit fiber plug 346 and retains them in alignment with each other. In operation, the optical signal emitted by transmitter 362 propagates through optical fiber 374 of the fiber pigtail assembly and is incident on lens 386. Lens 386 propagates this optical signal (by spreading it into a wider beam) through the air gap or cavity 392 between lenses 386 and 388 such that the focused optical signal is incident on lens 388. Lens 388 in turn focuses the optical signal into the end of transmit optical fiber 380. The ends of optical fibers 374 and 380 are glued to lenses 386 and 388 to suppress reflections.

Figure 29:
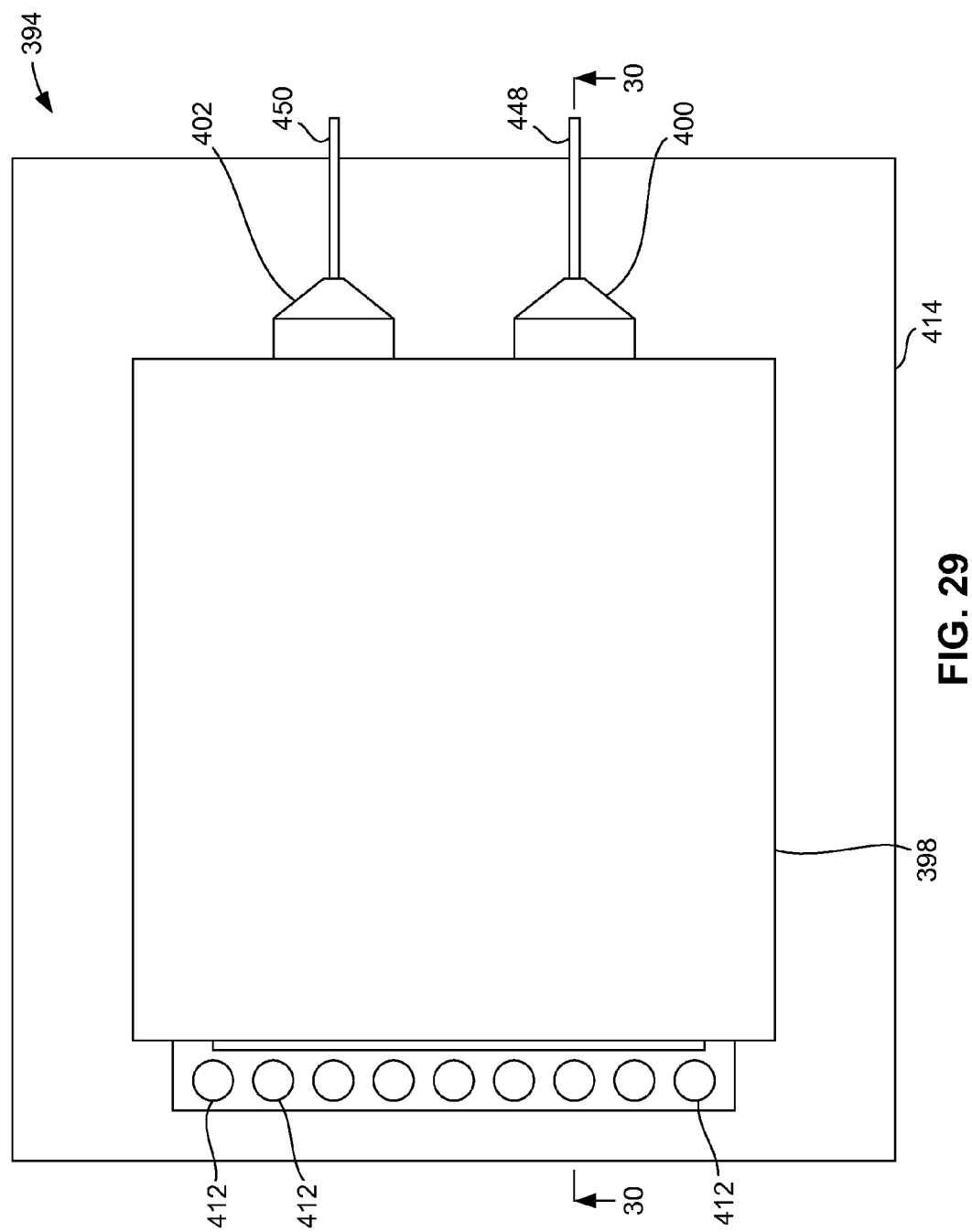
FIG. 29 is a top plan view of an optical data communication module, in accordance with a twelfth exemplary embodiment.
Figure 30:
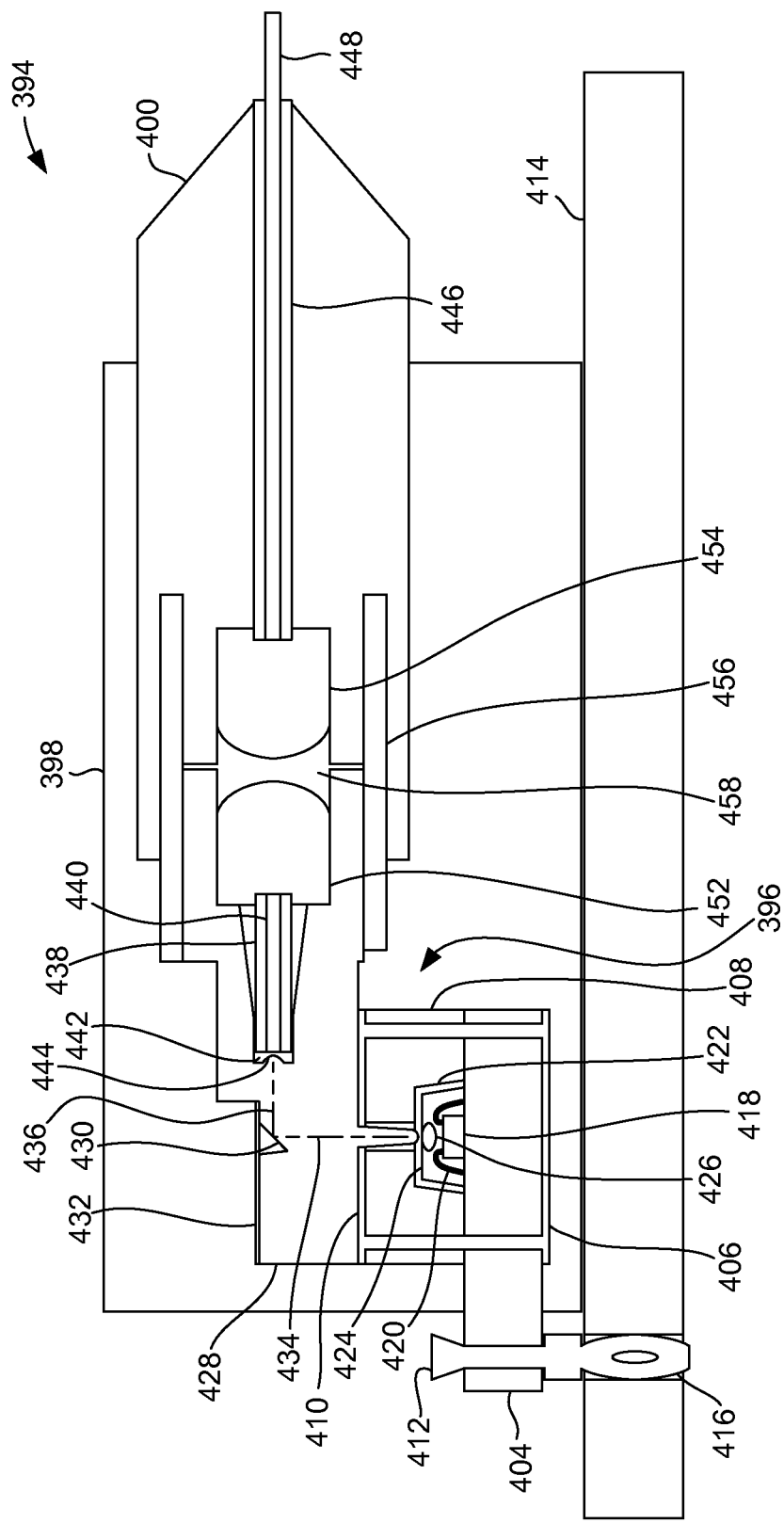
FIG. 30 is a sectional view taken along line 30-30 of FIG. 29.

As illustrated in FIGS. 29-30, in another embodiment, a transceiver assembly 394 includes an optical data transceiver module 396, a housing 398, a transmit fiber plug 400 and a receive fiber plug 402. As in other embodiments described above, optical data transceiver module 396 includes a first substrate 404 having a metal layer 406 on its first surface and a second substrate 408 having a metal layer 410 on its second surface. The second surface of first substrate 404 and first surface of second substrate 408 contact or abut each other. An array of electrically conductive pins (also known as press-in pins) 412 couple electrically conductive traces or pads (not shown for purposes of clarity) on first substrate 404 with PCB vias 416 or similar plated-through holes in mother board 414, thereby electrically coupling first substrate 404 and motherboard 414. Press-in pins 412 have compliant ends that compress in diameter upon being pressed into plated throughholes 416 similar to PCB vias.

It should be noted that press-in pins 412, like the above-described lead frames and connector blocks included in other embodiments, represent examples of various ways in which transceiver modules or transceiver assemblies can be electrically and mechanically connected to a motherboard or similar substrate. In view of the teachings herein, still other ways will occur readily to persons skilled in the art. Also, additional mechanical interconnections, such as any of the various types of posts and locking devices that are commonly used in PCB-based assemblies, can be included in other embodiments (not shown) to help secure a transceiver module or transceiver assembly to a motherboard or similar substrate.

As in other embodiments described above, an opto-electronic transmitter 418, (e.g., laser chip), is mounted on the second surface of first substrate 404. Opto-electronic transmitter 418 is electrically connected to traces or similar conductors in first substrate 404 by bond wires 420. A cavity 422 accommodates the height of opto-electronic transmitter 418 and bond wires 420. Opto-electronic transmitter 418 and bond wires 420 are encapsulated within a transparent overmold 424. A lens 426 is retained within overmold 424.

Opto-electronic transmitter 418 includes an optics block 428 similar to those described above with regard to other embodiments. Accordingly, optics block 428 has a reflective surface 430. A protective film 432 covers reflective surface 430. In operation, the optical transmit signal emitted by transmitter 418 propagates along a transmit path (indicated by axis 434) and is incident on reflective surface 430. Reflective surface 430 reflects the optical signal along another portion of the transmit path (indicated by axis 436). A fiber pigtail assembly comprising a ferrule 438 and optical fiber 440 has an end retained in a fiber port 442 of optics block 428. A lens 444 in optics block 428 is aligned along axis 436 and focuses the reflected optical signal into the end of optical fiber 440 in fiber port 442. Fiber port 442 widens into a cylindrical recess in which a lens 444 is retained.

Transmit fiber plug 400 is mateable with optical data transceiver module 396 by plugging transmit fiber plug 400 into an opening or port in housing 398. Transmit fiber plug 400 has a ferrule 446 that retains a transmit optical fiber 448. Receive fiber plug 402 carries a receive optical fiber 450 (FIG. 29) in the same manner.

An end portion of transmit fiber plug 400 abuts the end of fiber port 442 defined by the above-referenced cylindrical recess. This end portion of transmit fiber plug 400 similarly has a cylindrical recess. Lenses 452 and 454 are retained in the respective cylindrical recesses of these ends portions of fiber port 442 and transmit fiber plug 400. An alignment tube 456 spans these end portions of fiber port 442 and transmit fiber plug 400 and retains them in alignment with each other. In operation, the optical signal emitted by transmitter 418 along axis 434 is incident on reflective surface 430. Reflective surface 430 reflects the optical signal along axis 436 into the end of optical fiber 440 of the fiber pigtail assembly. The optical signal emitted by the other end of optical fiber 440 is incident on lens 452. Lens 452 propagates this optical signal (by spreading it into a wider beam) through the air gap or cavity 458 between lenses 452 and 454 such that the focused optical signal is incident on lens 454. Lens 454 in turn focuses the optical signal into the end of transmit optical fiber 448. The ends of optical fibers 440 and 448 are glued to lenses 386 and 388 to suppress reflections.

It should be noted that the invention has been described with respect to illustrative embodiments for the purpose of describing the principles and concepts of the invention. The invention is not limited to these embodiments. As will be understood by those skilled in the art in view of the description being provided herein, many modifications may be made to the embodiments described herein without deviating from the goals of the invention, and all such modifications are within the scope of the invention.

What is claimed is:

1. An optical data communication module, comprising:
    a first planar substrate having a first surface and a second surface, the first surface of the first planar substrate having a metal layer, the first planar substrate having an array of electrical contacts;
    an opto-electronic device mounted on the second surface of the first planar substrate and electrically connected to signal conductors of the first planar substrate, at least a portion of the signal conductors coupled to the array of electrical contacts;
    a second planar substrate having a first surface and a second surface, the first surface of the second planar substrate having a cavity therein, the opto-electronic device extending into the cavity, a region of the first surface of the second planar substrate surrounding the cavity in contact with the second surface of the first planar substrate, the second surface of the second planar substrate having a metal layer, a plurality of conductors oriented normal to the first planar substrate and second planar substrate extending through the first planar substrate and through the second planar substrate and electrically connecting the metal layer of the first surface of the first planar substrate to the metal layer of the second surface of the second planar substrate, the plurality of conductors distributed around a periphery of the opto-electronic device to provide shielding against electromagnetic interference, one of the first planar substrate and second planar substrate having a hole therethrough and extending to the opto-electronic device; and
    an optical element at least partly disposed in the hole and optically aligned with the opto-electronic device.

2. The optical data communication module of claim 1, wherein the opto-electronic device is encapsulated in a transparent material.

3. The optical data communication module of claim 1, wherein the optical element at least partly disposed in the hole is an optical fiber.

4. The optical data communication module of claim 1, wherein the optical element at least partly disposed in the hole is a lens.

5. The optical data communication module of claim 1, wherein the opto-electronic device is mounted on the second surface of the first planar substrate and electrically connected to conductors of the first planar substrate by an Embedded Wafer Level Ball Grid Array (eWLB).

6. The optical data communication module of claim 1, wherein the optical element at least partly disposed in the hole is a module fiber pigtail assembly comprising a module fiber ferrule and an optical fiber retained within the module fiber ferrule.

7. The optical data communication module of claim 6, further comprising a module barrel having an end mounted to the second surface of the second planar substrate, the module fiber pigtail assembly concentrically retained within the module barrel.

8. The optical data communication module of claim 7, further comprising:
    a fiber plug comprising a plug barrel and a plug fiber pigtail assembly concentrically retained within the plug barrel, the plug fiber pigtail assembly comprising a plug fiber ferrule and an optical fiber retained within the plug fiber ferrule; and
    an alignment tube having an open first end configured to receive the module barrel and an open second end receivable in an open end of the fiber plug, an end of the module barrel mechanically mateable with an end of the plug barrel when the open second end of the alignment tube is fully received in the open end of the fiber plug, an end of the module fiber pigtail assembly optically aligned with an end of the plug fiber pigtail assembly when the open second end of the alignment tube is fully received in the open end of the fiber plug.

9. The optical data communication module of claim 8, further comprising:
    a lens disposed between the end of the module fiber pigtail assembly and the end of the plug fiber pigtail assembly.

10. The optical data communication module of claim 1, further comprising a module optical structure having a reflective element and a fiber port, the module optical structure mounted on the first surface of the first planar substrate, the reflective element disposed in an optical path between the fiber port and the hole and oriented to redirect an optical signal between an optical axis of the opto-electronic device and an optical axis of the fiber port.

11. An optical data communication module, comprising:
    a first substrate assembly comprising a transmit portion, a receive portion, and an array of electrical contacts, the transmit portion having a transmit first planar substrate with a first surface and a second surface, the first surface of the transmit first planar substrate having a metal layer, the receive portion having a receive first planar substrate with a first surface and a second surface, the first surface of the receive first planar substrate having a metal layer;
    an opto-electronic transmitter mounted on the second surface of the transmit first planar substrate and electrically connected to a first group of signal conductors of the first substrate assembly, at least a portion of the first group of signal conductors coupled to the array of electrical contacts;
    an opto-electronic receiver mounted on the second surface of the receive first planar substrate and electrically connected to a second group of signal conductors of the first substrate assembly, at least a portion of the second group of signal conductors coupled to the array of electrical contacts;
    a transmit second planar substrate having a first surface and a second surface, the first surface of the transmit second planar substrate having a transmitter cavity therein, the opto-electronic transmitter extending into the transmitter cavity, a region of the first surface of the transmit second planar substrate surrounding the transmitter cavity in contact with the second surface of the transmit first planar substrate, the second surface of the transmit second planar substrate having a metal layer, a first plurality of conductors oriented normal to the transmit first planar substrate and the transmit second planar substrate extending through the transmit first planar substrate and through the transmit second planar substrate and electrically connecting the metal layer of the first surface of the transmit first planar substrate to the metal layer of the second surface of the transmit second planar substrate, the first plurality of conductors distributed around a periphery of the opto-electronic transmitter to provide shielding against electromagnetic interference, one of the transmit first planar substrate and transmit second planar substrate having a transmit hole therethrough and extending to the opto-electronic transmitter; and a first optical element at least partly disposed in the transmit hole and optically aligned with the opto-electronic transmitter;

a receive second planar substrate having a first surface and a second surface, the first surface of the receive second planar substrate having a receiver cavity therein, the opto-electronic receiver extending into the receiver cavity, a region of the first surface of the receive second planar substrate surrounding the receiver cavity in contact with the second surface of the receive first planar substrate, the second surface of the receive second planar substrate having a metal layer, a second plurality of conductors oriented normal to the receive first planar substrate and the receive second planar substrate extending through the receive first planar substrate and through the receive second planar substrate and electrically connecting the metal layer of the first surface of the receive first planar substrate to the metal layer of the second surface of the receive second planar substrate, the second plurality of conductors distributed around a periphery of the opto-electronic receiver to provide shielding against electromagnetic interference, one of the receive first planar substrate and the receive second planar substrate having a receive hole therethrough and extending to the opto-electronic receiver; and a second optical element at least partly disposed in the receive hole and optically aligned with the opto-electronic receiver.

12. The optical data communication module of claim 11, wherein a flexible material couples the transmit first planar substrate to the receive first planar substrate.

13. The optical data communication module of claim 11, wherein:
the opto-electronic transmitter is encapsulated in a transparent material; and
the opto-electronic receiver is encapsulated in a transparent material.

14. The optical data communication module of claim 11, wherein:
the first optical element at least partly disposed in the transmit hole is a transmit optical fiber; and
the second optical element at least partly disposed in the receive hole is a receive optical fiber.

15. The optical data communication module of claim 11, wherein:
the first optical element at least partly disposed in the transmit hole is a focusing transmit lens; and the second optical element at least partly disposed in the receive hole is a collimating receive lens.

16. The optical data communication module of claim 11, wherein:
the opto-electronic transmitter is mounted on the second surface of the transmit first planar substrate and electrically connected to conductors of the transmit first planar substrate by a first Embedded Wafer Level Ball Grid Array (eWLB); and
the opto-electronic receiver is mounted on the second surface of the transmit first planar substrate and electrically connected to conductors of the transmit first planar substrate by a second eWLB.

17. The optical data communication module of claim 11, wherein:
the first optical element at least partly disposed in the transmit hole is a module transmit fiber pigtail assembly comprising a module transmit fiber ferrule and a module transmit optical fiber retained within the module transmit fiber ferrule; and
the second optical element at least partly disposed in the receive hole is a module receive fiber pigtail assembly comprising a module receive fiber ferrule and a module receive optical fiber retained within the module receive fiber ferrule.

18. The optical data communication module of claim 17, further comprising:
a module transmit barrel having a first end mounted to the second surface of the transmit second planar substrate, the module transmit fiber pigtail assembly concentrically retained within the module transmit barrel; and
a module receive barrel having a first end mounted to the second surface of the receive second planar substrate, the module receive fiber pigtail assembly concentrically retained within the module receive barrel.

19. The optical data communication module of claim 18, further comprising:
a fiber plug comprising a plug transmit barrel, a plug receive barrel, a plug transmit fiber pigtail assembly, and a plug receive fiber pigtail assembly, the plug transmit fiber pigtail assembly concentrically retained within the plug transmit barrel, the plug receive fiber pigtail assembly concentrically retained within the plug receive barrel, the plug transmit fiber pigtail assembly comprising a plug transmit fiber ferrule and a plug transmit optical fiber retained within the plug transmit fiber ferrule, the plug receive fiber pigtail assembly comprising a plug receive fiber ferrule and a plug receive optical fiber retained within the plug receive fiber ferrule; and
an alignment tube structure comprising a transmit alignment tube coupled to a receive alignment tube, the transmit alignment tube having a first end configured to receive a second end of the module transmit barrel therein and a second end receivable in an end of the plug transmit barrel, the second end of the module transmit barrel mechanically mateable with the plug transmit barrel when the second end of the transmit alignment tube is fully received in the end of the plug transmit barrel, an end of the module transmit fiber pigtail assembly optically aligned with an end of the plug transmit fiber pigtail assembly when the second end of the transmit alignment tube is fully received in the end of the plug transmit barrel, the receive alignment tube having a first end configured to receive a second end of the module receive barrel therein and a second end receivable in an end of the plug receive barrel, the second end of the module receive barrel mechanically mateable with the plug receive barrel when the second end of the receive alignment tube is fully received in the end of the plug receive barrel, an end of the module receive fiber pigtail assembly optically aligned with an end of the plug receive fiber pigtail assembly when the second end of the receive alignment tube is fully received in the end of the plug receive barrel.

20. The optical data communication module of claim 19, further comprising:
a first lens disposed between the end of the module transmit fiber pigtail assembly and the end of the plug transmit fiber pigtail assembly; and
a second lens disposed between the end of the module receive fiber pigtail assembly and the end of the plug receive fiber pigtail assembly.

21. The optical data communication module of claim 11, further comprising:
a transmit module optical structure having a transmit-path reflective element and a transmit fiber port, the transmit module optical structure mounted on the first surface of the transmit first planar substrate, the transmit-path reflective element disposed in an optical transmit path between the transmit fiber port and the transmit hole and oriented to redirect an optical transmit signal between an optical axis of the opto-electronic transmitter and an optical axis of the transmit fiber port; and
a receive module optical structure having a receive-path reflective element and a receive fiber port, the receive module optical structure mounted on the first surface of the receive first planar substrate, the receive-path reflective element disposed in an optical receive path between the receive fiber port and the receive hole and oriented to redirect an optical receive signal between an optical axis of the opto-electronic receiver and an optical axis of the receive fiber port.

22. The optical data communication module of claim 11, further comprising:
an array of press-in pins electrically coupling the first substrate assembly to a motherboard.

* * * * *